US008885704B2

(12) United States Patent
Chien et al.

(10) Patent No.: US 8,885,704 B2
(45) Date of Patent: Nov. 11, 2014

(54) CODING PREDICTION MODES IN VIDEO CODING

(75) Inventors: Wei-Jung Chien, San Diego, CA (US); Xianglin Wang, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 475 days.

(21) Appl. No.: 13/248,653

(22) Filed: Sep. 29, 2011

(65) Prior Publication Data

US 2012/0082210 A1    Apr. 5, 2012

Related U.S. Application Data

(60) Provisional application No. 61/389,111, filed on Oct. 1, 2010, provisional application No. 61/411,699, filed on Nov. 9, 2010, provisional application No. 61/435,199, filed on Jan. 21, 2011.

(51) Int. Cl.
| | |
|---|---|
| *H04N 7/12* | (2006.01) |
| *H04N 19/196* | (2014.01) |
| *H04N 19/463* | (2014.01) |
| *H04N 19/194* | (2014.01) |
| *H04N 19/61* | (2014.01) |
| *H04N 19/96* | (2014.01) |
| *H04N 19/159* | (2014.01) |
| *H04N 19/13* | (2014.01) |

(52) U.S. Cl.
CPC ... *H04N 19/00218* (2013.01); *H04N 19/00369* (2013.01); *H04N 19/00551* (2013.01); *H04N 19/00363* (2013.01); *H04N 19/00781* (2013.01); *H04N 19/00969* (2013.01); *H04N 19/00121* (2013.01)
USPC .................................. 375/240.02; 375/240.01

(58) Field of Classification Search
CPC . H04N 7/50; H04N 7/26244; H04N 7/26271; H04N 7/26053; H04N 7/26941; H04N 19/00121; H04N 19/00218; H04N 19/00363; H04N 19/00551; H04N 19/00781; H04N 19/00969; H04N 19/00369; H04N 19/00; H04N 19/00006; H04N 19/0009; H04N 19/00981; H04N 7/26; H04N 7/325
USPC ...................................... 375/240.02
See application file for complete search history.

(56) References Cited

U.S. PATENT DOCUMENTS 7,170,937 B2    1/2007    Zhou
7,606,311 B2 *  10/2009   Hsu et al. .................. 375/240.23

(Continued)

FOREIGN PATENT DOCUMENTS

| EP | 0595544 A2 | 5/1994 |
| JP | 2010130635 A | 6/2010 |
| WO | 2011087292 A2 | 7/2011 |

OTHER PUBLICATIONS

Bjontegaard, G. et al., "Definition of New Coding Elements from Telenor," ITU—Telecommunications Standardization Sector, Document Q15-J-28, May 16-18, 2000, 25 pp.

(Continued)

*Primary Examiner* — Andy Rao
*Assistant Examiner* — Shan Elahi
(74) *Attorney, Agent, or Firm* — Shumaker & Sieffert, P.A.

(57) ABSTRACT

A video encoder can maintain, by generating, storing, adjusting, altering, and/or updating, one or more variable length coding (VLC) tables that represent a mapping of prediction modes to codewords. One or more codewords representing a selected prediction mode can be communicated to the decoder for a CU of a frame. The decoder maintains one or more VLC tables that match the VLC tables maintained by the video encoder. Thus, based on the one or more codewords received from the video encoder, the video decoder can determine the prediction mode used to encode a CU.

67 Claims, 6 Drawing Sheets

(56) References Cited

U.S. PATENT DOCUMENTS

| | | | |
|---|---|---|---|
| 8,675,734 B2* | 3/2014 | Jang et al. | 375/240.12 |
| 8,681,855 B2* | 3/2014 | Yin et al. | 375/240 |
| 2004/0081238 A1* | 4/2004 | Parhy | 375/240.16 |
| 2008/0089422 A1* | 4/2008 | Karczewicz | 375/240.23 |
| 2008/0089423 A1* | 4/2008 | Karczewicz | 375/240.23 |
| 2008/0111721 A1* | 5/2008 | Reznik | 341/67 |
| 2008/0111722 A1* | 5/2008 | Reznik | 341/67 |
| 2009/0110067 A1 | 4/2009 | Sekiguchi et al. | |
| 2009/0110070 A1 | 4/2009 | Takahashi et al. | |
| 2010/0128781 A1* | 5/2010 | Jang et al. | 375/240.12 |
| 2010/0296578 A1 | 11/2010 | Conklin | |
| 2011/0038422 A1* | 2/2011 | Cheon et al. | 375/240.18 |
| 2011/0248873 A1 | 10/2011 | Karczewicz et al. | |

OTHER PUBLICATIONS

International Search Report and Written Opinion of international application No. PCT/US2011/054229 dated Dec. 19, 2011, 18 pp.

Karczewicz, M. et al., "Video Coding Technology Proposal by Qualcomm Inc." Joint Collaborative Team on Video Coding, Document JCTVC-A121, Apr. 15-23, 2010, 24 pp.

Karczewicz, M. et al., "Improvements on VLC", Joint Collaborative Team on Video Coding, Document JCTVC-C263, Oct. 3, 2010, 5 pp.

Ugur, K. et al., "Description of video coding technology proposal by Tandberg Nokia Ericsson," Joint Collaborative Team on Video Coding, Document JCTVC-A119, Apr. 15-23, 2010, 33 pp.

Rehman et al., "Efficient Techniques for Signalling Intra Prediction Modes of H.264/Mpeg-4 Part 10," Proceedings of the First International Conference on Innovative Computing, Information and Control, 2006, 4 pp.

Bross et al., "WD4: Working Draft 4 of High-Efficiency Video Coding," 6th Meeting: JCTVC-F803_d2, Torino, IT, Jul. 14-22, 2011, 226 pp.

International Preliminary Report on Patentability—PCT/US2011/054229, The International Bureau of WIPO—Geneva, Switzerland, Jan. 17, 2013, 11.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

Wiegand et al., "WD1: Working Draft 1 of High-Efficiency Video Coding", JCTVC-C403, 3rd Meeting: Guangzhou, CN, Oct. 7-15, 2010, 137 pp.].

Wiegand et al., "WD2: Working Draft 2 of High-Efficiency Video Coding," JCTVC-D503, 4th Meeting: Daegu, KR, Jan. 20-28, 2011, 153 pp].

Wiegand et al., "WD3: Working Draft 3 of High-Efficiency Video Coding," Document JCTVC-E603, 5th Meeting: Geneva, CH, Mar. 16-23, 2011, 193 pp.

Second Written Opinion from International Application No. PCT?US2011/054229, dated Oct. 5, 2012, 10 pp.

Che, et.al., "Enhanced Context Modeling for Skip and Split Flag", Jan. 18, 2011, Joint Collaborative Team on Video Coding (JCT-VC) of ITU-T SG16 WP3 and ISO/IEC JTC1/SC29/WG11, Document: JCTVC-D254, 4 pp.

Drugeon, et.al., "Improvement of inter mode coding and split flags coding for LCEC", Mar. 10, 2011, Joint Collaborative Team on Video Coding (JCT-VC) of ITU-T SG16 WP3 and ISO/IEC JTC1/SC29/WG11, Document: JCTVC-E258, 5 pp.

* cited by examiner

CODING PREDICTION MODES IN VIDEO CODING

This application claims the benefit of U.S. Provisional Application No. 61/389,111 filed Oct. 1, 2010, U.S. Provisional Application No. 61/411,699 filed Nov. 9, 2010, and U.S. Provisional Application No. 61/435,199 filed Jan. 21, 2011, each of which is hereby incorporated by reference in its respective entirety.

TECHNICAL FIELD

This disclosure relates to video coding and, more particularly, relates to video compression techniques.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), or the emerging High Efficiency Video Coding (HEVC) standard, and extensions of such standards, to transmit and receive digital video information more efficiently.

Video compression techniques perform spatial prediction and/or temporal prediction to reduce or remove redundancy inherent in video sequences. For block-based video coding, a video frame or slice can be partitioned into video blocks or coding units (CUs). Video blocks in an intra-coded (I) frame or slice are encoded using spatial prediction with respect to neighboring blocks. Video blocks in an inter-coded (P or B) frame or slice can use spatial prediction with respect to neighboring blocks in the same frame or slice or temporal prediction with respect to other reference frames. Video blocks in a bidirectional predicted (B) frame are encoded using bidirectional prediction to calculate two motion vectors from reference frames in two different reference frame lists, typically one past frame and one future frame. Video blocks in a unidirectional predicted (P) frame are encoded using unidirectional prediction to calculate a single motion vector from a single reference frame list, typically a past frame.

SUMMARY

This disclosure generally describes techniques that may improve coding efficiency for quadtree structured video data by reducing the number of bits needed for a video encoder to signal a prediction mode to a video decoder, where the prediction mode may, for example, be one of a plurality of intra-prediction modes or one of a plurality of inter-prediction modes. Techniques of the present disclosure include using variable length codewords to signal a prediction mode for a CU. For example, a video encoder can maintain, by generating, storing, altering, adjusting, and/or updating, one or more variable length coding (VLC) tables that represent a mapping of prediction modes to codewords. One or more codewords representing a selected prediction mode can be communicated to the decoder for a CU of a frame. The decoder can maintain one or more VLC tables that match the VLC tables maintained by the video encoder. Thus, based on the one or more codewords received from the video encoder, the video decoder can determine the prediction mode used to encode a CU.

In one example, a method of coding a coded unit (CU) of video includes maintaining one or more variable length coding (VLC) tables that map VLC codewords to a plurality of prediction modes; receiving a first VLC codeword associated with a CU; determining one of the prediction modes for the CU based on the first VLC codeword; and, using the prediction mode to reconstruct the CU.

In another example, a method of coding a coded unit (CU) includes maintaining one or more variable length coding (VLC) tables that map VLC codewords to a plurality of prediction modes; determining one of the prediction modes for the CU; determining a VLC codeword from the one or more VLC tables based on the determined prediction mode; and, generating a syntax element containing the VLC codeword.

In another example, a device for processing video data includes a video coder for coding a coded unit (CU) of video, and the video coder is configured to maintain one or more variable length coding (VLC) tables that map VLC codewords to a plurality of prediction modes, receive a first VLC codeword associated with a CU, determine a prediction mode for the CU based on the first VLC codeword, reconstruct the CU using the prediction mode.

In another example, a device for processing video data includes a video coder for coding a coded unit (CU) of video, and the video coder is configured to maintain one or more variable length coding (VLC) tables that map VLC codewords to a plurality of prediction modes; determine one of the prediction modes for the CU; determine a VLC codeword from the one or more VLC tables based on the determined prediction mode; and, generate a syntax element containing the VLC codeword.

In another example, an apparatus for coding video data, the apparatus includes means for maintaining one or more variable length coding (VLC) tables that map VLC codewords to a plurality of prediction modes; means for receiving a first VLC codeword associated with a CU; means for determining one of the prediction modes for the CU based on the first VLC codeword; and, means for using the prediction mode to reconstruct the CU.

In another example, an apparatus for coding video data, the apparatus includes means for maintaining one or more variable length coding (VLC) tables that map VLC codewords to a plurality of prediction modes; means for determining one of the prediction modes for the CU; means for determining a VLC codeword from the one or more VLC tables based on the determined prediction mode; and, means for generating a syntax element containing the VLC codeword.

In a further example, a computer-readable storage medium having stored thereon instructions that, when executed, cause a processor of a device for coding video data to maintain one or more variable length coding (VLC) tables that map VLC codewords to a plurality of prediction modes; receive a first VLC codeword associated with a CU; determine one of the prediction modes for the CU based on the first VLC codeword; and, use the prediction mode to reconstruct the CU.

In another example, a computer-readable storage medium having stored thereon instructions that, when executed, cause one or more processors of a device for coding video data to maintain one or more variable length coding (VLC) tables that map VLC codewords to a plurality of prediction modes; determine one of the prediction modes for the CU; determine a VLC codeword from the one or more VLC tables based on the determined prediction mode; and, generate a syntax element containing the VLC codeword.

The details of one or more examples are set forth in the accompanying drawings and the description below. Other features, objects, and advantages will be apparent from the description and drawings, and from the claims.

DETAILED DESCRIPTION

This disclosure generally describes techniques that may improve coding efficiency for quadtree structured video data by reducing the number of bits needed for a video encoder to signal a prediction mode to a video decoder. Techniques of the present disclosure include using one or more variable length codewords to signal a prediction mode for a CU. For example, a video encoder can maintain one or more variable length coding (VLC) tables that represent a mapping of prediction modes to codewords. A codeword representing a selected prediction mode can be communicated to the decoder using VLC codewords for a CU of a frame. The decoder can generate one or more VLC tables that match the VLC tables maintained by the video encoder. Thus, based on the single codeword received from the video encoder, the video decoder can determine the prediction mode used to encode a CU, and then use that prediction mode to decode the CU.

Figure 1:
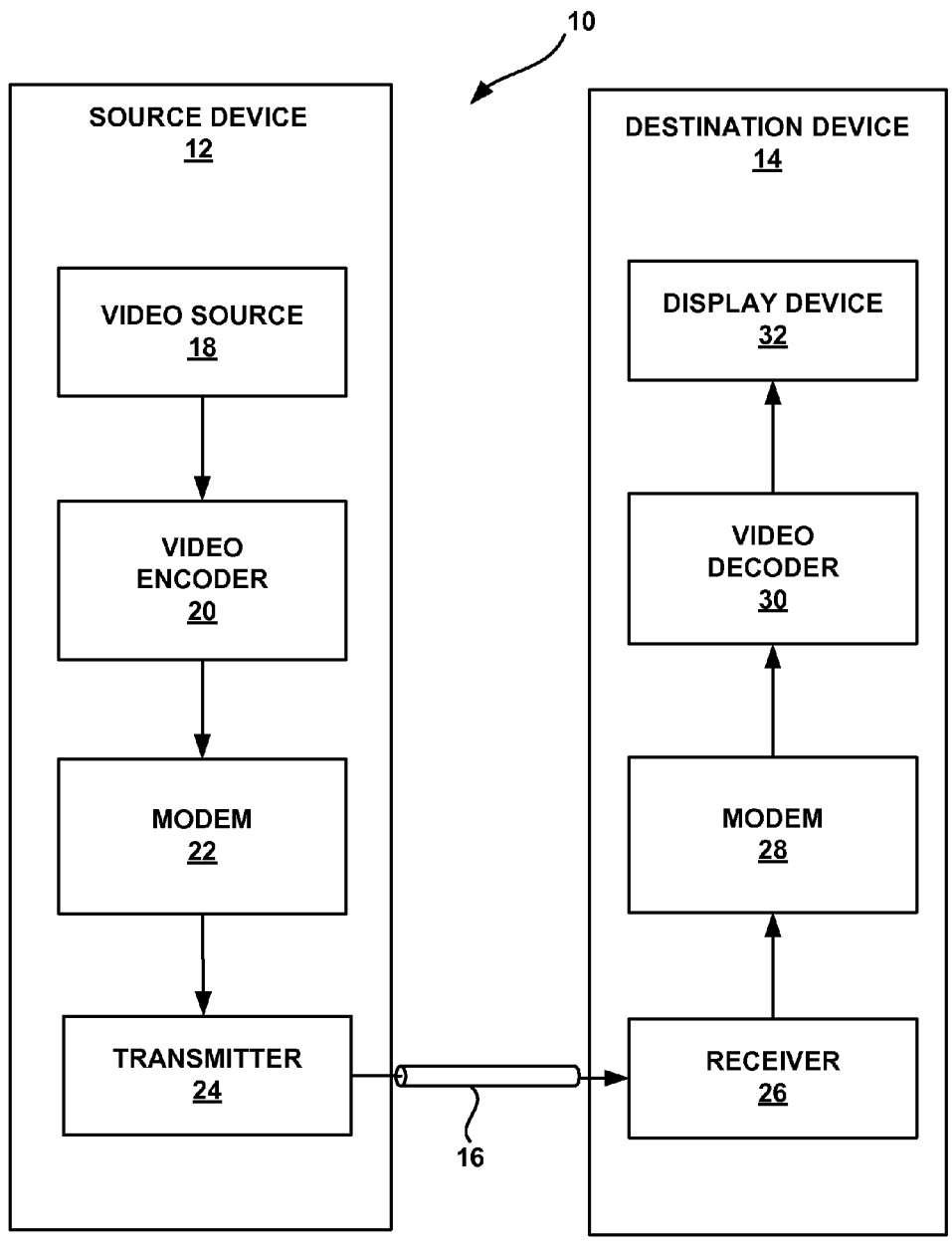
FIG. 1 is a block diagram illustrating an example video encoding and decoding system that may utilize techniques for efficiently coding prediction mode information for video blocks of a video frame.

FIG. 1 is a block diagram illustrating an example video encoding and video decoding system 10 that can utilize techniques for efficiently coding prediction mode information for video blocks of a video frame. As shown in FIG. 1, system 10 includes a source device 12 that transmits encoded video to a destination device 14 via a communication channel 16. Source device 12 and destination device 14 can comprise any of a wide range of devices. In some cases, source device 12 and destination device 14 can comprise wireless communication devices that can communicate video information over a communication channel 16, in which case communication channel 16 is wireless.

The techniques of this disclosure, which concern efficient coding of prediction mode information for video blocks, can be applicable, but are not necessarily limited, to wireless applications or settings. For example, these techniques can apply to over-the-air television broadcasts, cable television transmissions, satellite television transmissions, Internet video transmissions, encoded digital video that is encoded onto a storage medium, or other scenarios. Accordingly, communication channel 16 can comprise any combination of wireless or wired media suitable for transmission of encoded video data, and devices 12, 14 can comprise any of a variety of wired or wireless media devices such as mobile telephones, smartphones, digital media players, set-top boxes, televisions, displays, desktop computers, portable computers, tablet computers, gaming consoles, portable gaming devices, or the like.

In the example of FIG. 1, source device 12 includes a video source 18, video encoder 20, a modulator/demodulator (modem) 22 and a transmitter 24. Destination device 14 includes a receiver 26, a modem 28, a video decoder 30, and a display device 32. In other examples, a source device and a destination device can include other components or arrangements. For example, source device 12 can receive video data from an external video source 18, such as an external camera, a video storage archive, a computer graphics source, or the like. Likewise, destination device 14 can interface with an external display device, rather than including an integrated display device.

The illustrated system 10 of FIG. 1 is merely one example. Techniques for efficient coding of prediction mode information for video blocks can be performed by any digital video encoding and/or decoding device. The techniques may also be performed by a video encoder/decoder, typically referred to as a "CODEC." Moreover, the techniques of this disclosure may also be performed by a video preprocessor that codes video data. Source device 12 and destination device 14 are merely examples of such coding devices in which source device 12 generates coded video data for transmission to destination device 14. In some examples, devices 12, 14 can operate in a substantially symmetrical manner such that each of devices 12, 14 include video encoding and decoding components. Hence, system 10 can support one-way or two-way video transmission between video devices 12, 14, e.g., for video streaming, video playback, video broadcasting, or video telephony.

Video source 18 of source device 12 can include a video capture device, such as a video camera, a video archive containing previously captured video, and/or a video feed from a video content provider. As a further alternative, video source 18 can generate computer graphics-based data as the source video, or a combination of live video, archived video, and computer-generated video. In some cases, if video source 18 is a video camera, source device 12 and destination device 14 can form so-called camera phones or video phones. As mentioned above, however, the techniques described in this disclosure can be applicable to video coding in general, and can be applied to wireless and/or wired applications. In each case, the captured, pre-captured, or computer-generated video can be encoded by video encoder 20. The encoded video information can then be modulated by modem 22 according to a communication standard, and transmitted to destination device 14 via transmitter 24. Modem 22 can include various mixers, filters, amplifiers or other components designed for signal modulation. Transmitter 24 can include circuits designed for transmitting data, including amplifiers, filters, and one or more antennas.

In accordance with this disclosure, video encoder 20 of source device 12 can be configured to apply the techniques for reducing a cost of coding prediction mode information for video blocks. As will be described in more detail below, some current techniques for coding prediction modes include using a first bit to indicate if a CU is coded using a first prediction mode, a second bit to indicate if a CU is coded using a second prediction mode, and so on. Using these existing techniques, a video encoder can, in some instances, be forced to transmit the first three bits indicating if any of the first three modes is used every time a mode other than one of the first three is used, which can undesirably increase bit transmission when modes other than the first three modes occur frequently. According to an example of the techniques of this disclosure, video encoder 20 can signal any prediction mode for a CU using a single codeword as opposed to using the sequences of bits described above. In another example, video encoder 20 can signal a prediction mode as a combination of a first codeword and a second codeword.

Video encoder 20 can maintain one or more variable length coding (VLC) tables that represent a mapping of prediction mode values to codewords. As part of maintaining the one or more VLC tables, video encoder 20 can generate, store, and/or update the VLC tables. For any given prediction mode, a single codeword from a VLC table can be communicated to video decoder 30. In addition, some form of index swap or adaptation can be applied to fit a codeword assignment more adequately to the distribution of prediction modes. Referring back to the example above, if a fourth mode occurs more frequently than the second mode, then video encoder 20 can adaptively map the fourth mode to a codeword that is shorter than the codeword used for the second mode. In some implementations, video encoder 20 can transmit a first codeword and a second codeword to video decoder 30, where the first codeword is an escape code from a first VLC table indicating the mode used is found in a second VLC table. The second codeword identifies which mode of the second VLC table is used. The first and second VLC tables can both adaptively map modes to codewords based on the occurrence probabilities of modes.

Receiver 26 of destination device 14 receives information over channel 16, and modem 28 demodulates the information. The information communicated over channel 16 can include syntax information defined by video encoder 20, which is also used by video decoder 30, that includes syntax elements that describe characteristics and/or processing of prediction units (PUs), coding units (CUs) or other units of coded video, e.g., video slices, video frames, and video sequences or groups of pictures (GOPs). Display device 32 displays the decoded video data to a user, and can comprise any of a variety of display devices such as a cathode ray tube (CRT), a liquid crystal display (LCD), a plasma display, an organic light emitting diode (OLED) display, or another type of display device.

In accordance with this disclosure, video decoder 30 of destination device 14 can be configured to apply the techniques for reducing a cost of coding prediction mode information for video blocks. Video decoder 30 can maintain VLC tables with the same mappings as the VLC tables maintained by video encoder 20 by receiving information describing the mappings from video encoder 20. Video decoder 30 can also maintain the same mappings as video encoder 20 without receiving information from video encoder 20 that explicitly describes the mappings. In this way, video decoder 30 can execute the same techniques for VLC table generation as video encoder 20, such that tables generated by video decoder 30 match the tables generated by video encoder 20. Additionally, video decoder 30 can perform the same adaptation and updating techniques such that changes that occur to the VLC tables of video encoder 20 likewise occur at the VLC tables of video decoder 30. Accordingly, video decoder 30 can receive one or more codewords for a CU, and using the VLC tables, determine a prediction mode for the CU based on the one or more codewords.

In the example of FIG. 1, communication channel 16 can comprise any wireless or wired communication medium, such as a radio frequency (RF) spectrum or one or more physical transmission lines, or any combination of wireless and wired media. Communication channel 16 can form part of a packet-based network, such as a local area network, a wide-area network, or a global network such as the Internet. Communication channel 16 generally represents any suitable communication medium, or collection of different communication media, for transmitting video data from source device 12 to destination device 14, including any suitable combination of wired or wireless media. Communication channel 16 can include routers, switches, base stations, or any other equipment that can be useful to facilitate communication from source device 12 to destination device 14.

Video encoder 20 and video decoder 30 can operate according to a video compression standard, such as the emerging High Efficiency Video Coding (HEVC) standard or the ITU-T H.264 standard, alternatively referred to as MPEG-4, Part 10, Advanced Video Coding (AVC). The techniques of this disclosure, however, are not limited to any particular coding standard. Other examples include MPEG-2 and ITU-T H.263. Although not shown in FIG. 1, in some aspects, video encoder 20 and video decoder 30 can each be integrated with an audio encoder and decoder, and can include appropriate MUX-DEMUX units, or other hardware and software, to handle encoding of both audio and video in a common data stream or separate data streams. If applicable, MUX-DEMUX units can conform to the ITU H.223 multiplexer protocol, or other protocols such as the user datagram protocol (UDP).

The HEVC standardization efforts are based on a model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM provides as many as thirty-three intra-prediction encoding modes.

The HM refers to a block of video data as a coding unit (CU). Syntax data within a bitstream can define a largest coding unit (LCU), which is a largest coding unit in terms of the number of pixels. In general, a CU has a similar purpose to a macroblock of the H.264 standard, except that a CU does not have a size distinction. Thus, a CU can be split into sub-CUs. In general, references in this disclosure to a CU can refer to a largest coding unit of a picture or a sub-CU of an LCU. An LCU can be split into sub-CUs, and each sub-CU can be further split into sub-CUs. Syntax data for a bitstream can define a maximum number of times an LCU can be split, referred to as CU depth. Accordingly, a bitstream can also define a smallest coding unit (SCU).

LCUs and CUs may be split either symmetrically or asymmetrically. Symmetric splitting generally results in an LCU or CU being split into two or more sub-CUs of the same size. For example, a 64×64 LCU may be split symmetrically into two 64×32 blocks, two 32×64 blocks, or four 32×32 blocks. Asymmetric splitting generally results in an LCU or CU being split into two or more sub-CUs of different sizes. For example, a 64×64 LCU may be asymmetrically split into a 64×16 block and a 64×48 block. In some instance, asymmetric motion partitioning (AMP) may improve coding efficiency for irregular image patterns. In such instances, video encoder 20 may include in the video bitstream syntax indicating that AMP is enabled for a portion of video such as a sequence of frames or picture set. In other instances, video encoder 20 may include syntax indicating that AMP is disabled for a portion of video such as a sequence of frames or picture set.

A CU that is not further split can include one or more prediction units (PUs). In general, a PU represents all or a portion of the corresponding CU, and includes data for retrieving a reference sample for the PU. For example, when the PU is intra-mode encoded, the PU can include data describing an intra-prediction mode for the PU. As another example, when the PU is inter-mode encoded, the PU can include data defining a motion vector for the PU. The data defining the motion vector can describe, for example, a horizontal component of the motion vector, a vertical component of the motion vector, a resolution for the motion vector (e.g., one-quarter pixel precision or one-eighth pixel precision), a reference frame to which the motion vector points, and/or a reference frame list (e.g., list 0 or list 1) for the motion vector. Data for the CU defining the PU(s) can also describe, for example, partitioning of the CU into one or more PUs. Partitioning modes can differ between whether the CU is skip or direct mode encoded, intra-prediction mode encoded, or inter-prediction mode encoded.

A CU having one or more PUs can also include one or more transform units (TUs). Following prediction using a PU, a video encoder can calculate residual values for the portion of the CU corresponding to the PU. The residual values correspond to pixel difference values that can be transformed into transform coefficients, quantized, and scanned to produce serialized transform coefficients for entropy coding. A TU is not necessarily limited to the size of a PU. Thus, TUs can be larger or smaller than corresponding PUs for the same CU. In some examples, the maximum size of a TU can be the size of the corresponding CU. This disclosure uses the term "video block" to refer to any of a CU, PU, or TU.

Video encoder 20 and video decoder 30 each can be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. Each of video encoder 20 and video decoder 30 can be included in one or more encoders or decoders, either of which can be integrated as part of a combined encoder/decoder (CODEC) in a respective camera, computer, mobile device, subscriber device, broadcast device, set-top box, server, or the like.

A video sequence typically includes a series of video frames. A group of pictures (GOP) generally comprises a series of one or more video frames. A GOP can include syntax data in a header of the GOP, a header of one or more frames of the GOP, or elsewhere, that describes a number of frames included in the GOP. Each frame may include frame syntax data that describes an encoding mode for the respective frame. Video encoder 20 typically operates on video blocks within individual video frames in order to encode the video data. A video block can correspond to a coding unit (CU) or a prediction unit of the CU. The video blocks can have fixed or varying sizes, and can differ in size according to a specified coding standard. Each video frame can include a plurality of slices. Each slice can include a plurality of CUs, which may include one or more PUs.

As an example, the HEVC Test Model (HM) supports prediction in various CU sizes. The size of an LCU may be defined by syntax information. Assuming that the size of a particular CU is 2N×2N, the HM supports intra-prediction in sizes of 2N×2N or N×N, and inter-prediction in symmetric sizes of 2N×2N, 2N×N, N×2N, or N×N. The HM also supports asymmetric splitting for inter-prediction of 2N×nU, 2N×nD, nL×2N, and nR×2N. In asymmetric splitting, one direction of a CU is not split, while the other direction is split into 25% and 75%. The portion of the CU corresponding to the 25% split is indicated by an "n" followed by an indication of "Up", "Down," "Left," or "Right." Thus, for example, "2N×nU" refers to a 2N×2N CU that is split horizontally with a 2N×0.5N PU on top and a 2N×1.5N PU on bottom.

In this disclosure, "N×N" and "N by N" can be used interchangeably to refer to the pixel dimensions of a video block (e.g., CU, PU, or TU) in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a nonnegative integer value. The pixels in a block can be arranged in rows and columns. Moreover, blocks need not necessarily have the same number of pixels in the horizontal direction as in the vertical direction. For example, blocks can comprise N×M pixels, where M is not necessarily equal to N.

Video encoder 20 can code each CU using one of several prediction modes. The prediction modes can include, for example, a split mode, a skip mode, a direct mode, as well as additional modes for Inter_2N×2N, Inter_N×2N, Inter_2N× N, Inter_N×N, Inter_2N×nU, Inter_2N×nD, Inter_nL×2N, Inter_nR×2N, Intra_2N×2N, and Intra_N×N, where such modes refer to the sizes of the PUs and whether the mode is an intra- or inter-predictive mode. Split mode is not necessarily a mode of prediction as the others, but instead identifies whether a CU is further split into smaller CUs. In skip mode, a current PU is reconstructed based on a co-located block in a reference frame without residual data, resulting in the current PU being identical to the co-located block in the reference frame. In direct mode, a current PU is reconstructed based on a co-located block in a reference frame with residual data, resulting in the current PU correspond to the reference block plus residual data.

The modes are generally exclusive to one another, meaning any given CU is coded using only one of the modes. According to the techniques of this disclosure, video encoder 20 transmits a single codeword identifying the selected mode to video decoder 30. Using current techniques for encoding prediction modes, current generation video encoders can transmit a first bit indicating if a CU was coded using a split mode. If the CU was not coded using a split mode then a second bit can be transmitted indicating if the CU was coded using a skip mode. If the current generation video encoder did not code the CU using skip mode, then the current generation video encoder transmits a third bit indicating if the CU was coded using direct mode. If the CU was not coded using direct mode, then the current generation video encoder transmits additional bits indicating one of the additional modes. In some instances, a current generation video encoder can transmit additional bits indicating whether or not an additional mode, such as merge mode, was used.

The techniques of the present disclosure may improve upon these current techniques for coding prediction modes by using one or more variable length codewords to signal a prediction mode for a CU instead of dedicating bits to each of split mode, skip mode, direct mode, and merge mode, even in instances when those modes are not commonly used. For a particular frame of slice, certain modes may occur more frequently than other modes. If, for example, such a frequently occurring mode happens to be one of the additional modes (i.e. not split, skip, direct, or merge), then video encoder 20, utilizing the techniques of this disclosure, can signal that mode to video decoder 30 using a shorter codeword and without dedicating bits to skip mode, direct mode, and merge mode. In another example, if skip or direct modes occur more frequently than split mode, then video encoder 20 can utilize the techniques of this disclosure to assign shorter codewords to skip and direct modes and not dedicate a bit to split.

Typically, codewords in a VLC table have unique prefixes, meaning a shorter codeword cannot be a prefix for a longer codeword. As an example, if 001 is a codeword in a VLC table, then no other codeword in the VLC table begins with 001. In one example, the three shortest codewords in a VLC table might be 1, 01, and 001. According to the techniques of this disclosure, depending on the frequency of occurrence of a particular prediction mode for a frame or slice, any prediction mode might be mapped to these three shortest codewords. In particular, in some instances, depending on video content, split mode may not be frequently used relative to other prediction modes or may be very frequently used relative to other prediction modes. According to the techniques of this disclosure, split mode may be mapped to a shorter codeword when frequently occurring but mapped to a longer codeword when not frequently occurring.

If, for a particular slice, Intra_N×N is the most frequently occurring prediction mode for a particular frame or slice, then the Intra_N×N mode might be assigned the shortest codeword of 1, which may result in an overall savings of bits compared to previous techniques that signal the Intra_N×N mode by first sending three bits indicating whether skip, direct, or merge modes are used, followed by additional bits to identify the Intra_N×N mode. Techniques of the present disclosure further include adaptively mapping the prediction modes to codewords, such that if the frequency of occurrence for a particular prediction mode decreases relative to other prediction modes, then the particular prediction mode can be assigned a longer codeword, and if the frequency of occurrence for a particular prediction mode increases relative to other prediction modes, then the particular prediction mode can be assigned to a shorter codeword.

Following intra-predictive or inter-predictive coding to produce a PU for a CU, video encoder 20 may calculate residual data to produce one or more transform units (TUs) for the CU. PUs of a CU may comprise pixel difference data in the spatial domain (also referred to as the pixel domain), while TUs of the CU may comprise coefficients in the transform domain, e.g., following application of a transform such as a discrete cosine transform (DCT), an integer transform, a wavelet transform, or a conceptually similar transform to residual video data. The residual data may correspond to pixel differences between pixels of a block of the unencoded picture and prediction values of a PU of a CU used to predict the block of the picture. Video encoder 20 may form one or more TUs including the residual data for the CU. Video encoder 20 may then transform the TUs.

Following any transforms to produce transform coefficients, quantization of transform coefficients can be performed. Quantization generally refers to a process in which transform coefficients are quantized to possibly reduce the amount of data used to represent the coefficients. The quantization process may reduce the bit depth associated with some or all of the coefficients. For example, an n-bit value can be rounded down to an m-bit value during quantization, where n is greater than m.

In some examples, video encoder 20 can utilize a predefined scan order to scan the quantized transform coefficients to produce a serialized vector that can be entropy encoded. In other examples, video encoder 20 can perform an adaptive scan. After scanning the quantized transform coefficients to form a one-dimensional vector, video encoder 20 can entropy encode the one-dimensional vector, e.g., according to context adaptive variable length coding (CAVLC), context adaptive binary arithmetic coding (CABAC), syntax-based context-adaptive binary arithmetic coding (SBAC), or another entropy encoding methodology.

To perform CABAC, video encoder 20 can select a context model to apply to a certain context to encode symbols to be transmitted. The context can relate to, for example, whether neighboring values are non-zero or not. To perform CAVLC, video encoder 20 can select a variable length code for a symbol to be transmitted. Codewords in VLC can be constructed such that relatively shorter codes correspond to more probable symbols, while longer codes correspond to less probable symbols. In this way, the use of VLC may achieve a bit savings over, for example, using equal-length codewords for each symbol to be transmitted. In some cases, a codeword can be shortened to a fractional bit, i.e., less than one bit. The probability determination can be based on the context.

Video decoder 30 can operate in a manner essentially symmetrical to that of video encoder 20. For example, video decoder 30 can receive entropy encoded data representative of an encoded CU, including encoded PU and TU data. This received data can include syntax elements identifying how video encoder 20 encoded the CU. As described above, the syntax elements can include, among other information, a codeword identifying a prediction mode for the CU. Decoder 30 can maintain one or more VLC tables that match the VLC tables maintained by video encoder 20. Thus, based on the codeword received from video encoder 20, video decoder 30 can determine the prediction mode used to encode a CU and thus reconstruct the CU.

Video encoder 20 and video decoder 30 each can be implemented as any of a variety of suitable encoder or decoder circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 20 and video decoder 30 can be included in one or more encoders or decoders, either of which can be integrated as part of a combined video encoder/decoder (CODEC). An apparatus including video encoder 20 and/or video decoder 30 can comprise an integrated circuit, a microprocessor, and/or a wireless communication device, such as a cellular telephone.

Figure 2:
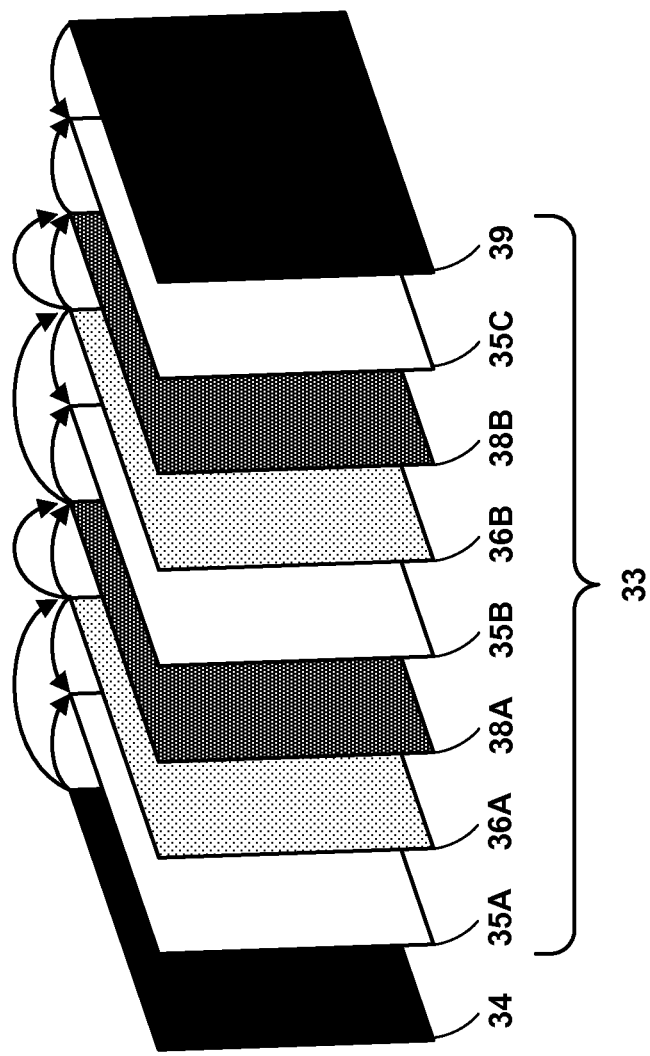
FIG. 2 is a conceptual diagram illustrating an example video sequence that includes generalized P-B (GPB) frames.

FIG. 2 is a conceptual diagram illustrating an example video sequence 33 that includes generalized P/B (GPB) frames 36A-36B and 38A-38B. A GPB syntax element associated with a current CU can indicate whether the frame containing the current CU was coded as a generalized P/B (GPB) frame. In this manner, GPB frames can be enabled or disabled, for example, on a sequence-by-sequence basis. As will be described in more detail below, the techniques of this disclosure are generally applicable to video coding regardless of whether GPB is enabled or disabled. In some instances, however, video encoder 20 can code prediction modes for CUs using different VLC tables depending on if a frame has GPB enabled or disabled. In other instances, video encoder 20 can code prediction modes for CUs without regard to whether or not a frame has GPB enabled.

In some cases, video sequence 33 may be referred to as a group of pictures (GOP). Video sequence 33, as illustrated, includes frames 35A, 36A, 38A, 35B, 36B, 38B, and 35C, and final frame 39 in display order. Frame 34 is a final frame in display order for a sequence occurring before sequence 33. FIG. 2 generally represents an exemplary prediction structure for a video sequence and is intended only to illustrate the frame references used for encoding different inter-mode frame types. An actual video sequence can contain more or fewer video frames of different frame types and in a different display order.

For block-based video coding, each of the video frames included in sequence 33 can be partitioned into video blocks or coding units (CUs). Each CU of a video frame can include one or more prediction units (PUs). Video blocks or PUs in an intra-coded (I) frame are encoded using spatial prediction with respect to neighboring blocks in the same frame. Video blocks or PUs in an inter-coded (P or B or GPB) frame can use spatial prediction with respect to neighboring blocks in the same frame or temporal prediction with respect to other reference frames.

Video blocks in a B frame can be encoded using bidirectional prediction to calculate two motion vectors from two different reference frame lists, traditionally one past frame and one future frame. In some cases, video blocks in a B frame can be encoded using unidirectional prediction from one of the two different reference frame lists. Video blocks in a P frame can be encoded using unidirectional prediction to calculate a single motion vector from a single reference frame list, traditionally a past frame. In accordance with the emerging HEVC standard, video blocks in a GPB frame can be encoded using either unidirectional prediction to calculate a single motion vector from one of two identical reference frame lists or bidirectional prediction to calculate two motion vectors from the two identical reference frame lists. The two identical reference frame lists can contain past reference frames.

In some cases, when a GPB frame is fully enabled for a given video slice, video frame, or video sequence, it may replace the standard P frame. In this case, all standard P frames can be treated as GPB frames such that a video encoder can determine to encode inter-mode frames as B frames or GPB frames. In other cases, when a GPB frame is partially enabled, all three inter-prediction modes (i.e., B, P or GPB) can be used. In this case, a video encoder can determine to encode inter-mode frames as B frames, P frames or GPB frames.

In the example of FIG. 2, final frame 39 is designated for intra-mode coding as an I frame. In other examples, final frame 39 can be coded with inter-mode coding, e.g., as a P frame with reference to final frame 34 of the preceding sequence. Video frames 35A-35C (collectively "video frames 35") are designated for coding as B frames using bidirectional prediction with reference to a past frame and a future frame. In the illustrated example, frame 35A is encoded as a B frame with reference to final frame 34 and frame 36A, as indicated by the arrows from frame 34 and frame 36A to video frame 35A. Frames 35B and 35C are similarly encoded.

Video frames 36A-36B (collectively "video frames 36") can be designated for coding as either standard P frames or GPB frames using unidirectional prediction with reference to a past frame. In the illustrated example, frame 36A is encoded as a P frame or a GPB frame with reference to final frame 34, as indicated by the arrow from frame 34 to video frame 36A. Frame 36B is similarly encoded.

Video frames 38A-38B (collectively "video frames 38") can be designated for coding as GPB frames using bidirectional prediction with reference to the same past frame. In other examples, GPB frames can be encoded using bidirectional prediction with reference to substantially similar past frames included in the same reference frame list. In the illustrated example, frame 38A is encoded as a GPB frame with two references to frame 36A, as indicated by the two arrows from frame 36A to video frame 38A. Frame 38B is similarly encoded.

Figure 3:
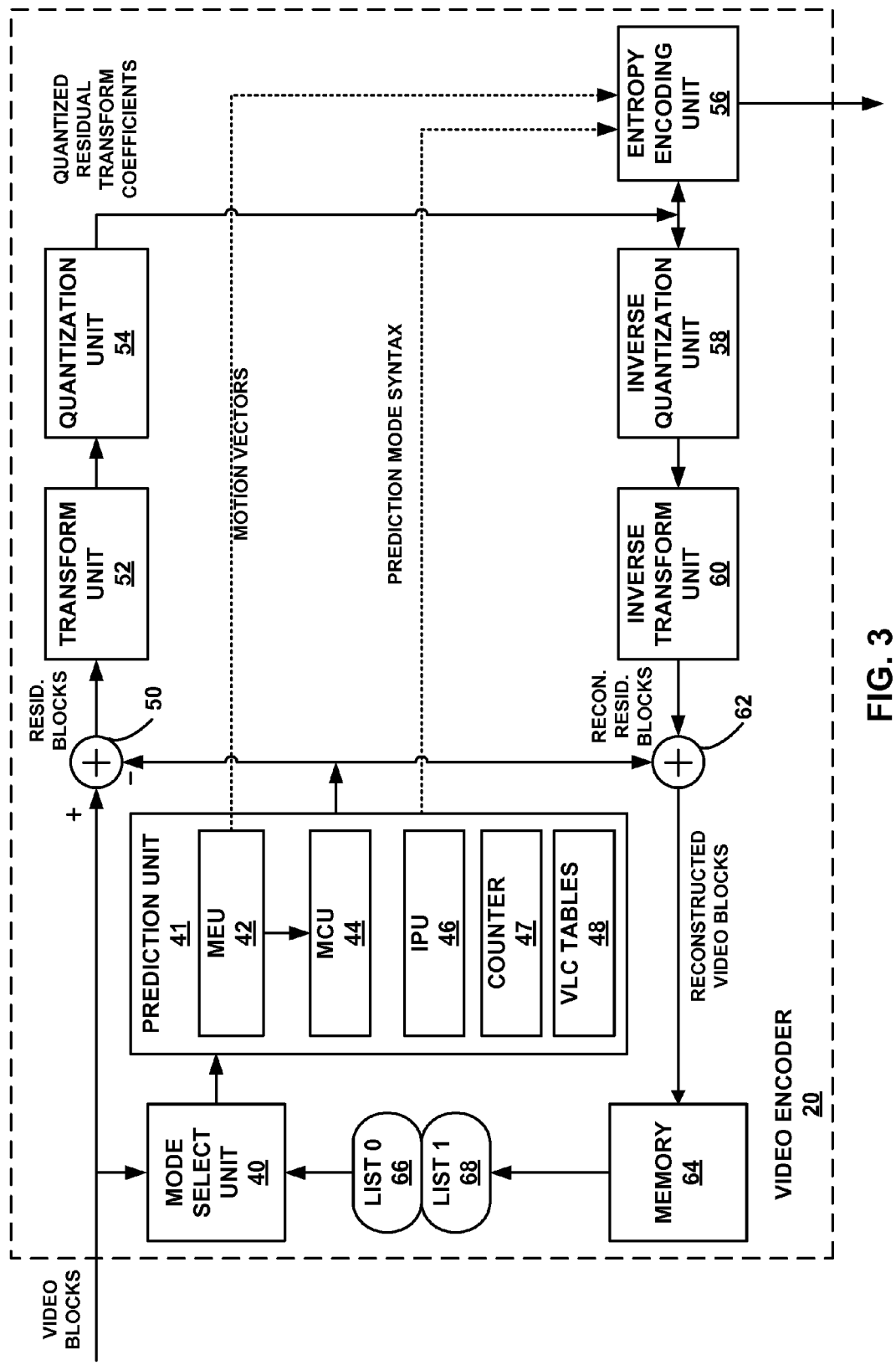
FIG. 3 is a block diagram illustrating an example video encoder that may implement techniques for efficiently coding prediction mode information for video blocks of a video frame.

FIG. 3 is a block diagram illustrating an example of video encoder 20 that can implement techniques for efficiently coding prediction mode information for video blocks of a video frame. Video encoder 20 can perform intra- and inter-coding of blocks within video frames, including CUs, or PUs of CUs. Intra-coding relies on spatial prediction to reduce or remove spatial redundancy in video within a given video frame. Inter-coding relies on temporal prediction to reduce or remove temporal redundancy in video within adjacent frames of a video sequence. Intra-mode (I mode) can refer to any of several spatial based compression modes. Inter-modes such as unidirectional prediction (P mode), bidirectional prediction (B mode), or generalized P/B prediction (GPB mode) can refer to any of several temporal-based compression modes.

As shown in FIG. 3, video encoder 20 receives a current video block within a video frame to be encoded. In the example of FIG. 3, video encoder 20 includes mode select unit 40, prediction unit 41, memory 64, summer 50, transform unit 52, quantization unit 54, and entropy encoding unit 56. Prediction unit 41 includes motion estimation unit 42 (MEU 42), motion compensation unit 44 (MCU 44), and intra prediction unit 46 (IPU 46). Prediction unit 41 further maintains one or more VLC tables, shown as VLC tables 48 in FIG. 3. FIG. 3 shows mode select unit 40 and prediction unit 41 separately for purposes of explanation, but in implementation, the functionality of mode select unit 40 and prediction unit 41 may be highly integrated. Accordingly, functions ascribed to mode select unit 40 may be performed by prediction unit 41 and vice versa in some configurations of video encoder 20. For video block reconstruction, video encoder 20 also includes inverse quantization unit 58, inverse transform unit 60, and summer 62. A deblocking filter (not shown in FIG. 3) may also be included to filter block boundaries to remove blockiness artifacts from reconstructed video. If desired, the deblocking filter would typically filter the output of summer 62.

During the encoding process, video encoder 20 receives a video frame or slice to be coded. The frame or slice can be divided into multiple CUs or video blocks. Mode select unit 40 can select one of the coding modes, intra or inter, for a current video block based on error results, and prediction unit 41 can provide the resulting intra- or inter-coded block to summer 50 to generate residual block data and to summer 62 to reconstruct the encoded block for use as a reference frame. The prediction modes can include a split mode, where a CU is split into smaller CUs as described above. Each smaller CU can then be further split or coded using one of the prediction modes. The prediction modes can also include a skip mode, where a current PU is reconstructed based on a co-located block in a reference frame without residual data, resulting in the current PU being identical to the reference block, or a direct mode, where a current PU is reconstructed based on a co-located block in a reference frame with residual data, resulting in the current PU corresponding to the reference block plus residual data. Other predictive modes can include Inter_2N×2N, Inter_N×2N, Inter_2N×N, Inter_N×N, Inter_2N×nU, Inter_2N×nD, Inter_nL×2N, Inter_nR×2N, Intra_2N×2N, and Intra_N×N, where such modes refer to the sizes of the PUs and whether the mode is an intra- or inter-predictive mode.

Intra prediction unit 46 within prediction unit 41 can perform intra-predictive coding of the current video block relative to one or more neighboring blocks in the same frame or slice as the current block to be coded to provide spatial compression. The current video block refers to a video block currently being coded. Intra prediction unit 46 can generate a prediction block for the current video block based on one or more previously encoded neighboring blocks within a common series of video blocks (e.g., frame or slice). Intra prediction unit 46 can, for example, perform spatial prediction to generate the prediction block by performing interpolation using one or more previously encoded neighboring blocks within the current frame. The one or more adjacent blocks within the current frame can, for example, be retrieved from memory 64, which can comprise any type of memory or data storage device to store one or more previously encoded frames or blocks. Intra prediction unit 46 can perform the interpolation in accordance with an intra-prediction mode of a set of prediction modes.

Motion estimation unit 42 and motion compensation unit 44 within prediction unit 41 perform inter-predictive coding of a current video block relative to one or more predictive blocks in one or more reference frames to provide temporal compression. The one or more reference frames can be selected from a first reference frame list (list 0) 66 and/or a second reference frame list (list 1) 68 stored in memory 64.

Motion estimation unit 42 can be configured to determine the inter-prediction mode for a video frame according to a predetermined pattern for a video sequence. The predetermined pattern can designate video frames in the sequence as P frames and/or B frames. In some cases, a GPB frame can be enabled such that one or more video frame can be designated as GPB frames. In other cases, when a GPB frame is enabled, motion estimation unit 42 can determine whether to encode originally designated P frames as GPB frames. The latter case can depend on whether the GPB frame is fully or partially enabled.

Motion estimation unit 42 and motion compensation unit 44 can be highly integrated, but are illustrated separately for conceptual purposes. Motion estimation, performed by motion estimation unit 42, is the process of generating motion vectors, which estimate motion for video blocks. A motion vector, for example, can indicate the displacement of a PU or video block within a current video frame relative to a predictive block within a reference frame. A predictive block is a block that is found to closely match the portion of the CU including the PU to be coded in terms of pixel difference, which can be determined by sum of absolute difference (SAD), sum of square difference (SSD), or other difference metrics. In some examples, video encoder 20 can calculate values for sub-integer pixel positions of reference frames stored in memory 64. For example, video encoder 20 can calculate values of one-quarter pixel positions, one-eighth pixel positions, or other fractional pixel positions of the reference frame. Therefore, motion estimation unit 42 can perform a motion search relative to the full pixel positions and fractional pixel positions and output a motion vector with fractional pixel precision.

Motion estimation unit 42 calculates a motion vector for a PU or video block of an inter-coded frame by comparing the PU to blocks of a reference frame in either list 0 66 or list 1 68 in memory 64. For example, when the inter-coded frame comprises a P frame, motion estimation unit 42 can use unidirectional prediction for a video block in the P frame and calculate a single motion vector from the one of list 0 66 and list 1 68 that includes identifiers for past frames, traditionally list 0 66.

When the inter-coded frame comprises a B frame, for example, list 0 66 and list 1 68 can include identifiers for different reference frames, typically past frames and future frames. Motion estimation unit 42 can use bidirectional prediction for a video block of the B frame and calculate two motion vectors from list 0 66 and list 1 68. In some cases, motion estimation unit 42 can use unidirectional prediction for the video block of the B frame and calculate a single motion vector from one of reference frame lists 66, 68.

In accordance with the emerging HEVC standard, when the inter-coded frame comprises a GPB frame, list 0 66 and list 1 68 will include identifiers for identical reference frames. In particular, each list includes the same list of reference frames. The reference frames included in list 0 66 and list 1 68 can comprise past frames. In this case, motion estimation unit 42 can use bidirectional prediction for a video block of the GPB frame and calculate two motion vectors, one from list 0 66 and one from list 1 68. Motion estimation unit 42 can also use unidirectional prediction for the video block of the GPB frame and calculate a single motion vector from one of the list 0 66 and list 1 68.

When one of the reference frame lists is preferred over the other reference frame list, it may be more efficient to, by default, use the preferred reference frame list for unidirectional prediction. This may be the case when unidirectional prediction for a B frame is most often performed based on one of the reference frame lists over the other. For example, unidirectional prediction for a B frame may typically be performed based on past reference frames from list 0 66, similar to a P frame. In that example, motion compensation unit 44 can determine that list 0 66 is the preferred reference frame list. This is also true when the GPB frame is enabled such that list 0 66 and list 1 68 contain identifiers for identical reference frames. In that case, motion compensation unit 44 may arbitrarily select one of list 0 66 and list 1 68 as the preferred reference frame list to always be used for unidirectional prediction instead of selecting between the two identical reference frame lists. For example, motion compensation unit 44 may select list 0 66 as the preferred reference frame list.

Motion estimation unit 42 sends the calculated motion vector to entropy encoding unit 56 and motion compensation unit 44. Motion compensation, performed by motion compensation unit 44, can involve fetching or generating the predictive block based on the motion vector determined by motion estimation. Video encoder 20 forms a residual video block by subtracting the predictive block from the current video block being coded. Summer 50 represents the component or components that perform this subtraction operation.

Motion compensation unit 44 can calculate prediction mode information for a PU of a current CU by retrieving the predictive block identified by the motion vector for the PU. The prediction information can include, for example, a motion prediction direction, motion vector information including motion predictors, and reference frame list information. Motion compensation unit 44 can also generate syntax elements defined to represent the prediction information calculated for a current video block or PU. Video encoder 20 can then encode the prediction information as the syntax elements and signal the syntax elements to video decoder 30.

After motion compensation unit 44 generates the predictive block for the current video block based on the motion vectors and generates the syntax elements to represent prediction information for the current video block, video encoder 20 forms a residual video block by subtracting the predictive block from the current video block. Transform unit 52 can form one or more transform units (TUs) from the residual block. Transform unit 52 applies a transform, such as a discrete cosine transform (DCT) or a conceptually similar transform, to the TU, producing a video block comprising residual transform coefficients. The transform can convert the residual block from a pixel domain to a transform domain, such as a frequency domain.

Transform unit 52 can send the resulting transform coefficients to quantization unit 54. Quantization unit 54 quantizes the transform coefficients to further reduce bit rate. The quantization process may reduce the bit depth associated with some or all of the coefficients. The degree of quantization can be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy codes the quantized transform coefficients. For example, entropy encoding unit 56 may perform context adaptive variable length coding (CAVLC), context adaptive binary arithmetic coding (CABAC), or another entropy encoding technique. Following the entropy encoding by entropy encoding unit 56, the encoded bitstream may be transmitted to a video decoder, such as video decoder 30, or archived for later transmission or retrieval.

Entropy encoding unit 56 may also entropy encode the motion vectors and the other prediction syntax elements for the current video block being coded. For example, entropy encoding unit 56 may construct header information that includes appropriate syntax elements generated by motion compensation unit 44 for transmission in the encoded bitstream. At the PU or video block level, the syntax elements can include motion vectors and motion prediction direction. At higher levels, the syntax elements can include a GPB enabled flag that indicates whether a GPB frame is enabled for a given video frame, and a GPB encoded flag that indicates whether a given video frame is encoded as a GPB frame. A video decoder can use these syntax elements to retrieve the predictive blocks and reconstruct the original video blocks encoded by video encoder 20.

To entropy encode the syntax elements, entropy encoding unit 56 can perform CABAC and binarize the syntax elements into one or more binary bits based on a context model. In this example, described in more detail above, entropy encoding unit 56 can apply a binarization adapted by motion compensation unit 44 to link a single-bit binarization with unidirectional prediction from a preferred reference frame. Entropy encoding unit can also perform CAVLC and encode the syntax elements as codewords according to probabilities based on context. In this example, described in more detail above, entropy encoding unit 56 can encode a bit of a syntax element as a shortened codeword based on a probability initialization of the bit biased toward a preferred reference list by motion compensation unit 44.

Inverse quantization unit 58 and inverse transform unit 60 apply inverse quantization and inverse transformation, respectively, to reconstruct the residual block in the pixel domain for later use as a reference block of a reference frame. Motion compensation unit 44 can calculate a reference block by adding the residual block to a predictive block of one of the reference frames within list 0 66 or list 1 68 stored in memory 64. Motion compensation unit 44 can also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reference block for storage in memory 64. The reference block can be used by motion estimation unit 42 and motion compensation unit 44 as a reference block to inter-predict a block in a subsequent video frame.

As part of the coding process, prediction unit 41 may also send prediction mode syntax to entropy encoding unit 56 for inclusion in the bitstream. The prediction mode syntax can identify a prediction mode used for a particular CU. Prediction unit 41 maintains VLC tables 48, which map prediction modes to codewords. For any particular prediction mode, prediction unit 41 may determine a codeword from VLC tables 48 and send that codeword to entropy encoding unit 56 to be included in the bitstream. Table 1 below shows an example mapping of codewords to prediction modes that may be maintained by prediction unit 41 in VLC tables 48 for CUs. In some implementations, prediction unit 41 can use Table 1 only for CUs with GPB enabled and use a separate VLC table for CUs where GPB is disabled. Table 2 below shows an example mapping of codewords to prediction modes that can be maintained by prediction unit 41 in VLC tables 48 for CUs where GPB is disabled. As can be seen by comparing Table 1 to Table 2, Table 1 does not include an entry for Direct_UniL1 because the two lists used for directional prediction (e.g. list 0 66 and list 1 68 in FIG. 3) are the same. Therefore, only one unidirectional mode (represented in Table 1 as Direct_UniL0) is needed.

TABLE 1

(GPB enabled)

| | |
|---|---|
| Split | 1 |
| Skip | 01 |
| Merge | 001 |
| Direct_Bi | 00011 |
| Inter_2Nx2N | 0000111 |
| Inter_2NxN | 0000110 |
| Inter_Nx2N | 0000101 |
| Inter_NxN | 0000100 |
| Inter_2NxnU | 0000011 |
| Inter_2NxnD | 0000010 |
| Inter_nLx2N | 0000001 |
| Inter_nRx2N | 00000001 |
| Intra_2Nx2N | 000000001 |
| Intra_NxN | 000000000 |
| Direct_UniL0 | 00010 |

TABLE 2

(GPB disabled)

| | |
|---|---|
| Split | 1 |
| Skip | 01 |
| Merge | 001 |
| Direct_Bi | 00011 |
| Inter_2Nx2N | 0000111 |
| Inter_2NxN | 0000110 |
| Inter_Nx2N | 0000101 |
| Inter_NxN | 0000100 |
| Inter_2NxnU | 0000011 |
| Inter_2NxnD | 0000010 |
| Inter_nLx2N | 0000001 |
| Inter_nRx2N | 00000001 |
| Intra_2Nx2N | 0000000001 |
| Intra_NxN | 0000000000 |
| Direct_UniL0 | 00010 |
| Direct_UniL1 | 0000111 |

In some implementations, a single table, such as Table 2, may be maintained for both CUs where GPB is enabled and CUs where GPB is disabled. If using one table for both types of CUs, certain prediction modes may be assigned longer codewords if those prediction modes occur less frequently compared to other prediction modes. For example, prediction mode Direct_UniL1 may occur more frequently relative to other prediction modes for CUs where GPB is disabled than it does relative to other prediction modes for all CUs (i.e., both CUs where GPB is disabled and CUs where GPB is enabled).

According to the example depicted above in Table 1 and Table 2, prediction unit 41 can signal each prediction mode for a CU according to a VLC codeword with a size (e.g., bit length) that corresponds to a frequency of occurrence for the prediction mode. The particular assignment of codewords to prediction modes shown in Tables 1 and Table 2 are merely one example, and as will be discussed in more detail below, prediction unit 41 may dynamically alter the mapping of codewords to prediction modes based on how often certain prediction modes occur for a particular video sequence.

According to another example, prediction unit 41 may separate the prediction modes into two or more groups and code each group together using a single codeword for each group. For example, a first number of prediction modes (e.g., split, skip, direct, merge) can be signaled by a first codeword, while a second number of prediction modes (e.g., Inter_2N× 2N, Inter_N×2N, Inter_2N×N, InterN×N, Inter2N×nU, Inter_2N×nD, Inter_nL×2N, Inter_nR×2N, Intra_2N×2N, and/or Intra_N×N) can be signaled by a second codeword. According to such an example, a last symbol of a first group, sometimes referred to as an escape code, can indicate that another codeword exists for a current CU. According to these examples, the mapping of codewords to prediction modes can be dynamically adjusted for each grouping. Tables 3 and 4 below show one example of how prediction unit 41 can separate prediction modes into two or more groups.

TABLE 3

| Split | 1 |
| Skip | 01 |
| Merge | 0011 |
| Direct | 0010 |
| Other modes | 000 |

TABLE 4

| Direct_Bi | 00011 |
| Inter_2Nx2N | 111 |
| Inter_2NxN | 110 |
| Inter_Nx2N | 101 |
| Inter_NxN | 100 |
| Inter_2NxnU | 011 |
| Inter_2NxnD | 010 |
| Inter_nLx2N | 001 |
| Inter_nRx2N | 0001 |
| Intra_2Nx2N | 00001 |
| Intra_NxN | 00000 |

According to the example of tables 3 and 4 above, a codeword of 000 in table 3 indicates that the prediction mode is to be selected using Table 4. If prediction unit 41 codes a CU using prediction mode Inter_N×2N, for example, then prediction unit 41 first generates a codeword of 000 to indicate the prediction mode is to be determined based on Table 4 instead of Table 3, and then generates a codeword of 101 to indicate which prediction mode from Table 4 was used for the CU.

According to another example, when a merge flag is signaled for a current CU, one or more merge flags can be signaled combined with a partition size of the CU. For example, a prediction mode of Inter_2N×2N can be signaled with a single merge flag as Inter_2N×2N_merge_0 or Inter_2N×2N_merge_1. As another example, a prediction mode of Inter_N×2N can be signaled with two merge flags as Inter_N×2N_merge_00, Inter_N×2N_merge_01, Inter_N× 2N_merge_10 or Inter_N×2N_merge_11. According to this example, one or more symbols representing merge and prediction mode flags in combination can be represented in a VLC codeword based on a number of occurrences (e.g., shorter symbol in the codeword if more occurrences of the combined flags), as described above. Also, in some examples, a codeword that includes a combined indication of prediction mode and merge flag can be represented with other prediction modes as a single code word, or multiple groups of codewords, as described above.

As described above, according to some examples, an encoder can signal an inter_pred_idc, which can indicate a direction of motion prediction for a current CU and ref_idx jointly as a single code word (e.g., Bi_R0_R0, Bi_R0_R1, Bi_R1_R0, Bi_R0_R1, UniL0_R0, UniL0_R1, UniL1_R0, and UniL1_R). Where a direct prediction mode is used for a current CU, a value of ref_idx may always have a value of 0. According to this example, different coding tables than the examples shown above can be used. For example, where a direct prediction mode is used for a current CU, code words Bi_R0_R1, Bi_R1_R0, Bi_R0_R1, UniL0_R1, and UniL1_R1 may not be signaled.

According to another example, an additional code table can be used to code the syntax element inter_pred_ic. For example, depending on a value of GPB, different code tables can be used to indicate values for Bi, UniL0, and/or UniL1. According to this example, if GPB is enabled, a code word of 1 can represent the value Bi (bidirectional prediction with reference to List 0 and List 1), a code word of 01 can represent a value UniL0 (unidirectional prediction with reference to List 0), and a code word of 00 can represent a value UniL1 (unidirectional prediction with reference to List 1). Also according to this example, a single bit code word can be used to indicate Bi and UniL0. As another example, a single code table can be used whether GPB is disabled or enabled to indicate Bi, UniL0 and UniL1 values. According to this example, UniL1 can be assigned a longer code word. For example, Bi can be assigned a code word of 1, UniL0 can be assigned a code word of 01, and UniL1 can be assigned a code word of 00.

According to another example, where GPB is disabled, one code table can be used to indicate split, skip, merge, Direct_Bi, Direct_UniL0, Direct_UniL1, Inter_2N×2N, Inter_N×2N, Inter_2N×N, Inter_N×N, Inter_2N×nU, Inter_2N×nD, Inter_nL×2N, Inter_nR×2N, Intra_2N×2N, and Intra_N×N. Table 5 below illustrates one example, of such a code table.

According to another example, prediction unit 41 can separate the prediction modes into two or more groups and maintain separate sets of VLC tables for CUs that have GPB enabled and CUs that have GPB disabled. Table 5 below shows an example of a first group of prediction modes mapped to codewords for CUs where GPB is disabled. The remaining prediction modes (e.g. Inter_2N×2N, Inter_N× 2N, Inter_2N×N, Inter_N×N, Inter_2N×nU, Inter_2N×nD, Inter_nL×2N, Inter_nR×2N, Intra_2N×2N, and Intra_N×N) can be coded as combination of the escape code (0000 in this example) plus a VLC codeword from another table as described above in relation to Table 3 and Table 4.

TABLE 5

| Split | 11 |
| Skip | 10 |
| Merge | 0001 |
| Direct_Bi | 0010 |
| Direct_UniL0 | 001 |
| Direct_UniL1 | 010 |
| Other modes | 0000 |

Table 6 below shows an example of a first group of prediction modes mapped to codewords for CUs where GPB is enabled. As can be seen by comparing Table 6 to Table 5, Table 5 includes an additional mode (Direct_UniL1) that is not present in Table 6. As with Table 5, the remaining prediction modes (e.g. Inter_2N×2N, Inter_N×2N, Inter_2N×N, Inter_N×N, Inter_2N×nU, Inter_2N×nD, Inter_nL×2N, Inter_nR×2N, Intra_2N×2N, and Intra_N×N) can be coded as combination of the escape code (0000 in this example) plus a VLC codeword from another table as described above in relation to Table 3 and Table 4.

TABLE 6

| | |
|---|---|
| Split | 1 |
| Skip | 01 |
| Merge | 0011 |
| Direct_Bi | 0010 |
| Direct_UniL0 | 0001 |
| Other modes | 0000 |

Table 7 below shows an example of a first group of prediction modes mapped to codewords for CUs regardless of whether or not GPB is enabled or disabled. As with Table 5 and Table 6, the remaining prediction modes (e.g. Inter_2N× 2N, Inter_N×2N, Inter_2N×N, Inter_N×N, Inter_2N×nU, Inter_2N×nD, Inter_nL×2N, Inter_nR×2N, Intra_2N×2N, and Intra_N×N) can be coded as combination of the escape code (0000 in this example) plus a VLC codeword from another table as described above in relation to Table 3 and Table 4. As can be seen by comparing Table 7 to Table 5, Table 7 includes the same modes in the first group of modes, but the codeword mapping between prediction modes and codewords is different. This difference can be attributed to differences in how frequently certain modes occur depending on whether or not CUs with GPB enabled and CUs with GPB disabled are treated the same or differently.

TABLE 7

| | |
|---|---|
| Split | 11 |
| Skip | 10 |
| Merge | 01 |
| Direct_Bi | 001 |
| Direct_UniL0 | 0001 |
| Direct_UniL1 | 00000 |
| Other modes | 00001 |

According to another example, prediction unit 41 can maintain separate sets of VLC tables for CUs that that have AMP enabled and CUs that have AMP disabled. As discussed above, whether or not a particular CU has AMP enabled or disabled may be signaled in an encoded bitstream by syntax associated with a higher level coding unit, such as an LCU, slice, frame, picture set, sequence, etc. Tables 8-11 show examples of VLC tables that may be maintained by prediction unit 41 for use when AMP is enabled. For CUs that are not SCUs and have AMP enabled, prediction unit 41 can select a codeword from Table 8. For CUs that are SCUs and have AMP enabled, prediction unit 41 can select a codeword from Table 9, and if the escape code of Table 9 is selected, prediction unit 41 can select an additional codeword from either Table 10 or Table 11. As can be seen by comparing Table 8 to Table 9, split mode can be removed for CUs that are SCU. If Inter N×N is enabled, then prediction unit 41 can select the additional codeword from Table 10. If Inter N×N mode is disabled, then prediction unit 41 can select the additional codeword from Table 11. The size of an SCU may be either explicitly signaled in the bitstream, or may be discernible based on other signaled information such as LCU size and maximum CU depth. Whether or not Inter N×N mode is enabled or disabled for a particular CU may similarly be determined from syntax associated with a higher level coding unit such as an LCU, slice, frame, picture set, sequence, etc. Therefore, a video decoder can determine if a CU is an SCU and determine if Inter N×N is enabled or disabled based on information in the encoded bitstream.

TABLE 8

| CU is not an SCU | |
|---|---|
| Mode | Codeword |
| Split | 1 |
| Merge_Skip | 01 |
| Merge | 001 |
| Inter_2Nx2N | 0001 |
| Inter_Nx2N | 00001 |
| Inter_2NxN | 000001 |
| Intra_2Nx2N | 0000001 |
| Inter_2NxnU | 00000001 |
| Inter_2NxnD | 000000001 |
| Inter_nLx2N | 0000000001 |
| Inter_nRx2N | 0000000000 |

TABLE 9

| CU is an SCU | |
|---|---|
| Mode | Codeword |
| Merge_Skip | 1 |
| Merge | 01 |
| Inter_2Nx2N | 001 |
| Inter_Nx2N | 0001 |
| Inter_2NxN | 00001 |
| Escape (go to Table 10 or Table 11) | 000001 |
| Inter_2NxnU | 0000001 |
| Inter_2NxnD | 00000001 |
| Inter_nLx2N | 000000001 |
| Inter_nRx2N | 000000000 |

TABLE 10

| Inter NxN enabled | |
|---|---|
| Mode | Codeword |
| Intra_2Nx2N | 1 |
| Intra_NxN | 01 |
| Inter_NxN | 00 |

TABLE 11

| Inter NxN disabled | |
|---|---|
| Mode | Codeword |
| Intra_2Nx2N | 1 |
| Intra_NxN | 0 |

Tables 12-15 show examples of VLC tables that may be maintained by prediction unit 41 for use when AMP is disabled. For CUs that have AMP disabled and are not SCUs, prediction unit 41 can select a codeword from Table 12. For CUs that have AMP disabled and are SCUs, prediction unit 41 can select a codeword from Table 13, and if the escape code of Table 13 is selected, select an additional codeword from either Table 14 or Table 15. If Inter N×N is enabled, then prediction unit 41 can select the additional codeword from Table 14. If Intern N×N mode is disabled, then prediction unit 41 can select the additional codeword from Table 15. As discussed above, a video decoder can determine if a CU is an SCU and determine if Inter N×N is enabled or disabled based on information in the encoded bitstream.

TABLE 12

| CU is not SCU | |
|---|---|
| Mode | Codeword |
| Split | 1 |
| Merge_Skip | 01 |
| Merge | 001 |
| Inter_2Nx2N | 0001 |
| Inter_Nx2N | 00001 |
| Inter_2NxN | 000001 |
| Intra_2Nx2N | 000000 |

TABLE 13

| CU is SCU | |
|---|---|
| Mode | Codeword |
| Merge_Skip | 1 |
| Merge | 01 |
| Inter_2Nx2N | 001 |
| Inter_Nx2N | 0001 |
| Inter_2NxN | 00001 |
| Escape (go to Table 14 or Table 15) | 00000 |

TABLE 14

| Inter NxN enabled | |
|---|---|
| Mode | Codeword |
| Intra_2Nx2N | 1 |
| Intra_NxN | 01 |
| Inter_NxN | 00 |

TABLE 15

| Inter NxN disabled | |
|---|---|
| Mode | Codeword |
| Intra_2Nx2N | 1 |
| Intra_NxN | 0 |

The mappings of codewords to prediction modes shown in Tables 1-15 are merely examples for purposes of explanation. It is contemplated that other mappings of codewords can also be used, and more particularly, it is further contemplated that the mapping of codewords to prediction modes can be dynamic such that the mapping changes based on the occurrence of certain prediction modes.

VLC tables 48 can include separate sets of VLC tables for different CU depths, where "CU depth" generally refers to how many times an LCU has been split. For example, a particular video sequence can include LCUs that are 64×64, which can in turn be split into 4 CUs that are 32×32, which in turn can each be split into 4 CUs that are 16×16, and so on. Each of 64×64, 32×32, 16×16, etc. represents a different CU depth that can have its own associated set of VLC tables. By maintaining separate VLC tables for different CU depths, the techniques of this disclosure can results in transmitting a prediction mode to a decoder using fewer bits. For example, for a particular slice or frame, Inter_2N×2N mode can occur more frequently than Intra_2N×2N mode for 64×64 CUs, but Intra_2N×2N mode may occur more frequently than Inter_2N×2N mode for 8×8 CUs. By maintaining separate sets of VLC tables for different CU depths, prediction unit 41 can be able to more frequently use shorter codewords, and thus reduce the bits needed to signal prediction modes.

Additionally, prediction unit 41 can implement different VLC techniques for different CU depths. For example, for 64×64 CUs, prediction unit 41 may separate the prediction modes into two or more groups, such as the VLC tables of Tables 3-7. However, for smaller CUs such as 8×8 and 4×4, prediction unit 41 may maintain a single VLC table for all prediction modes as described above in relation to Table 1 and Table 2 for example.

As introduced above, prediction unit 41 can dynamically alter the mapping of codewords to prediction modes stored in VLC tables 48 based on how often prediction modes occur for a particular slice or frame. This dynamically altering can occur individually for all VLC tables maintained by VLC tables 48. For example, the VLC tables associated with a first CU depth can be altered independent of the VLC tables associated with a second CU depth, and VLC tables associated with GPB enabled can be altered independently of VLC tables associated with GPB disabled. Counter 47 can track the occurrence of prediction modes for a particular slice or frame or other series of video blocks, and for prediction modes that occur more frequently than other prediction modes, map the more frequently occurring prediction modes to shorter codewords. For prediction modes that occur less frequently than other prediction modes, counter 47 can similarly map the less frequently occurring prediction modes to longer codewords. In some implementations, a particular grouping of video blocks, such as a slice or frame, may begin with a default mapping of prediction modes to codewords. The default mapping may, for example, be one or more of the mappings shown in Tables 1-15 above.

Figure 4:
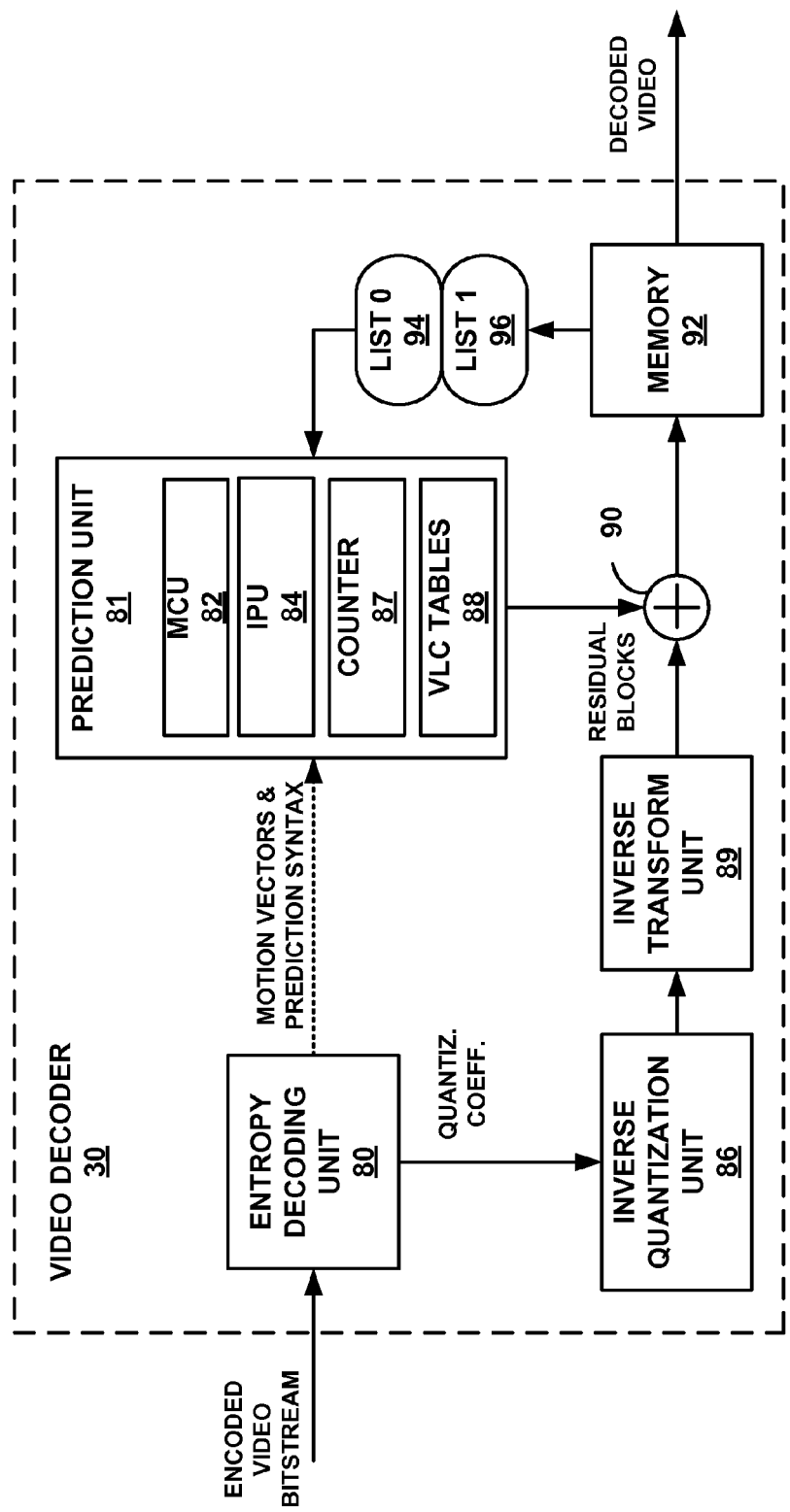
FIG. 4 is a block diagram illustrating an example video decoder that may implement techniques for efficiently coding prediction mode information for video blocks of a video frame.

FIG. 4 is a block diagram illustrating an example of video decoder 30 that may implement techniques for efficiently coding prediction mode information for video blocks of a video frame. In the example of FIG. 4, video decoder 30 includes an entropy decoding unit 80, prediction unit 81, inverse quantization unit 86, inverse transform unit 89, summer 90, and memory 92. Prediction unit 81 includes motion compensation unit 82 (MCU 82) and intra prediction unit 84 (IPU 84). Prediction unit 81 maintains VLC tables 88, which can be dynamically updated by counter 87. Video decoder 30 can, in some examples, perform a decoding pass generally reciprocal to the encoding pass described with respect to video encoder 20 (FIG. 3).

During the decoding process, video decoder 30 receives an encoded video bitstream that includes an encoded video frame and syntax elements that represent a prediction mode from a video encoder, such as video encoder 20. Entropy decoding unit 80 of video decoder 30 entropy decodes the bitstream to generate quantized coefficients, motion vectors, and the prediction syntax. Entropy decoding unit 80 forwards the motion vectors and other prediction syntax to prediction unit 81. Video decoder 30 can receive the syntax elements at the video block or PU level, the video slice level, the video frame level and/or the video sequence level.

Intra prediction unit 84 of prediction unit 81 can generate prediction data for a video block of the current video frame based on a signaled intra prediction mode and data from previously decoded blocks of the current frame. Motion compensation unit 82 of prediction unit 81 produces predictive blocks based on the motion vectors and prediction syntax received from entropy decoding unit 80. The predictive blocks can be produced from one or more of a first reference frame list (list 0) 94 and/or a second reference frame list (list 1) 96 stored in memory 92.

Motion compensation unit 82 can also perform interpolation based on interpolation filters. Motion compensation unit 82 can use interpolation filters as used by video encoder 20 during encoding of the video block to calculate interpolated values for sub-integer pixels of a reference block. Motion compensation unit 82 can determine the interpolation filters used by video encoder 20 from the received syntax elements and use the interpolation filters to produce predictive blocks.

Motion compensation unit 82 determines prediction information for the current video block by parsing the motion vectors and prediction syntax, and uses the prediction information to produce the predictive blocks for the current video block being decoded. Motion compensation unit 82 uses some of the received syntax elements to determine sizes of CUs used to encode the current frame, split information that describes how each CU of the frame is split, modes indicating how each split is encoded (e.g., intra- or inter-prediction), an inter-prediction slice type (e.g., B slice, P slice, or GPB slice), one or more reference frame lists for the frame, motion vectors for each inter-encoded PU or CU of the frame, motion prediction direction for each inter-encoded PU or CU of the frame, and other information to decode the current video frame.

Motion compensation unit 82 can parse the syntax at the video frame level or the video sequence level to determine whether a GPB frame is enabled or allowed for the current video frame. For example, motion compensation unit 82 can determine that a GPB frame is enabled based on a GPB enable flag received in the syntax at either the video frame level or the video sequence level. The GPB enable flag can be defined to indicate that the GPB frame is disabled or enabled. Motion compensation unit 82 can also parse the syntax at the video slice level or the video frame level to determine reference frame list information for the current video frame. Video decoder 30 then stores list 0 94 and list 1 96 that contain identifiers for reference frames, as indicated by the syntax, in memory 92. When the current video frame is a GPB frame, list 0 94 and list 1 96 contain identifiers for identical reference frames.

Inverse quantization unit 86 inverse quantizes, i.e., de-quantizes, the quantized transform coefficients provided in the bitstream and decoded by entropy decoding unit 80. The inverse quantization process can include use of a quantization parameter $QP_Y$ calculated by video encoder 20 for each CU or video block to determine a degree of quantization and, likewise, a degree of inverse quantization that should be applied. Inverse transform unit 89 applies an inverse transform, e.g., an inverse DCT, an inverse integer transform, or a conceptually similar inverse transform process, to the transform coefficients in order to produce residual blocks in the pixel domain.

After motion compensation unit 82 generates the predictive block for the current video block based on the motion vectors and prediction syntax elements, video decoder 30 forms a decoded video block by summing the residual blocks from inverse transform unit 89 with the corresponding predictive blocks generated by motion compensation unit 82. Summer 90 represents the component or components that perform this summation operation. If desired, a deblocking filter can also be applied to filter the decoded blocks in order to remove blockiness artifacts. The decoded video blocks are then stored in memory 92, which provides reference blocks of reference frames for subsequent motion compensation. Memory 92 also produces decoded video for presentation on a display device, such as display device 32 of FIG. 1.

In accordance with the techniques of this disclosure, video decoder 30 can reduce a cost of coding prediction mode information for video blocks. As part of the decoding process, prediction unit 81 can also receive prediction mode syntax from entropy decoding unit 80. The prediction mode syntax can identify a prediction mode used for a particular CU. Prediction unit 81 maintains VLC tables 88, which map prediction modes to codewords. VLC tables 88 maintain the same mappings of prediction modes to codewords as the VLC tables maintained by the video encoder that transmitted the encoded video bit stream to video decoder 30. For example, if a video encoder maintains the example mappings shown in Tables 1-15, then VLC tables 88 likewise maintains the mappings shown in Tables 1-15. For any particular codeword received from entropy decoding unit 80, prediction unit 81 can determine a prediction mode from VLC tables 88.

As described in more detail above with relation to FIG. 3, prediction unit 81 can maintain one VLC table for all prediction modes or can separate the prediction modes into one or more groups, where each group has a separate table. Additionally, prediction unit 81 can maintain separate tables for different CU depths and can maintain separate VLC tables for frames where GPB is enabled and frames where GPB is disable.

Prediction unit 81 can dynamically alter the mapping of codewords to prediction modes stored in VLC tables 88 based on how often prediction modes occur for a particular slice or frame. The techniques for altering VLC tables 88 can mirror techniques implemented at a video encoder, such that VLC tables 88 match VLC tables used by the video encoder to encode the prediction modes. As described in more detail relative to VLC tables 48 of FIG. 3, this dynamically altering can occur individually for all VLC tables maintained by VLC tables 88. For example, the VLC tables associated with a first CU depth can be altered independently of the VLC tables associated with a second CU depth, and VLC tables associated with GPB enabled can be altered independently of VLC tables associated with GPB disabled. Counter 87 can track the occurrence of prediction modes for a particular slice or frame or other series of video blocks, and for prediction modes that occur more frequently than other prediction modes, map the more frequently occurring prediction modes to shorter codewords. For prediction modes that occur less frequently than other prediction modes, counter 87 can similarly map the less frequently occurring prediction modes to longer codewords. In some implementations, a particular grouping of video blocks, such as a slice or frame, can begin with a default mapping of prediction modes to codewords. The default mapping can, for example, be one or more of the mappings shown in Tables 1-15 above.

Figure 5:
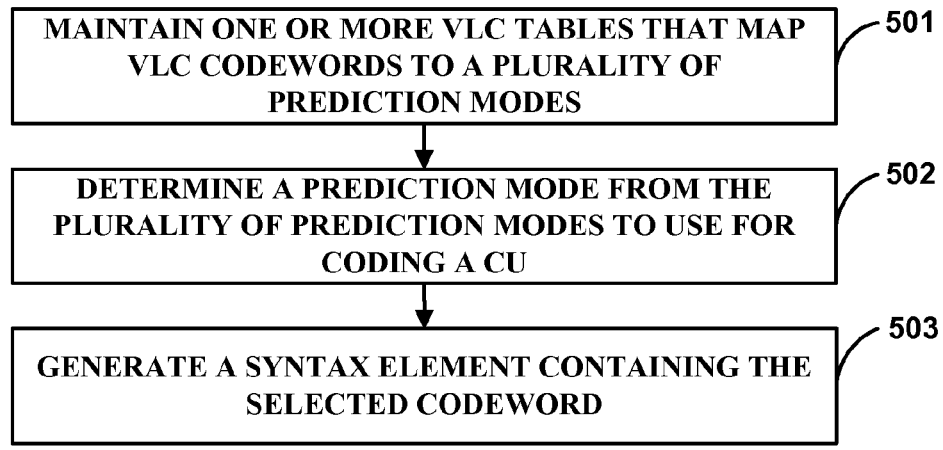
FIG. 5 is a flow diagram illustrating an encoding technique consistent with this disclosure.

FIG. 5 is a flow diagram illustrating an encoding technique consistent with this disclosure. The encoding techniques of FIG. 5 will be described with reference to FIGS. 1-4. Prediction unit 41 of video encoder 20 maintains one or more VLC tables (e.g. VLC tables 48) that map VLC codewords to a plurality of prediction modes (501). Prediction unit 41 determines a prediction mode from the plurality of prediction modes to use for coding a CU (502). Prediction unit 41 selects a codeword in VLC tables 48 that is mapped to the identified prediction mode and generates a syntax element containing the selected codeword (503). Based on counting a number of occurrences of each prediction mode, counter 47 can adjust the mapping of prediction modes to codewords maintained by VLC tables 48.

Figure 6:
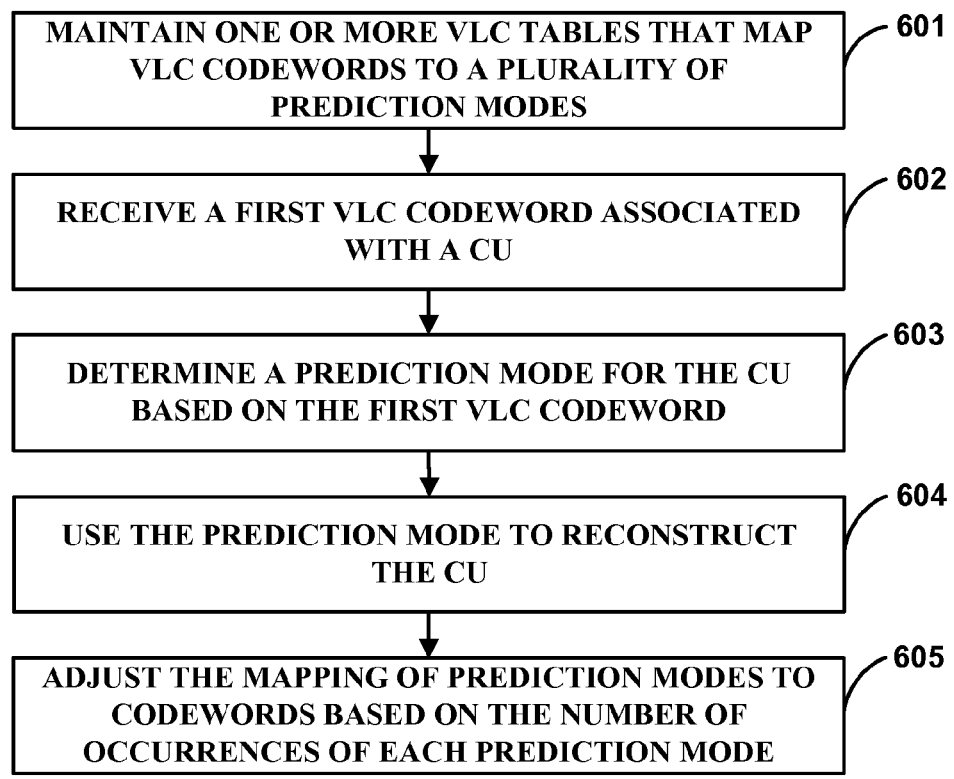
FIG. 6 is a flow diagram illustrating a decoding technique consistent with this disclosure.

FIG. 6 is a flow diagram illustrating a decoding technique consistent with this disclosure. The decoding techniques of FIG. 6 will be described with reference to FIGS. 1-4. Although this disclosure will generally describe the techniques of FIG. 6 as being performed by a video decoder such as video decoder 30, the techniques of FIG. 6 can also be performed by a video encoder such as video encoder 20 as part of a video encoding process. Prediction unit 81 of video decoder 30 maintains one or more VLC tables (e.g. VLC tables 88) that map VLC codewords to a plurality of prediction modes (601). The plurality of prediction modes includes, for example, one or more prediction modes selected from a group consisting of skip, direct, merge, Inter_2N×2N, Inter_N×2N, Inter_2N×N, InterN×N, Inter2N×nU, Inter_2N×nD, Inter_nL×2N, Inter_nR×2N, Intra 2N×2N, and Intra_N×N. VLC tables 88 can include a first group of VLC tables associated with a first CU depth and a second group of VLC tables associated with a second CU depth. VLC tables 88 can also include a first group of VLC tables associated with CUs of frames that were coded as generalized P/B (GPB) frames and a second group of VLC tables associated with CUs of frames that were not coded as GPB frames. As described above, VLC tables 88 may also include a first group of VLC tables associated with CUs that have AMP enabled and a second group of VLC tables associated with CUs that have AMP disabled.

In an encoded video bitstream, video decoder 30 receives a first VLC codeword associated with a CU (602). In some implementations, video decoder 30 can also receive a second VLC codeword. As described above, video decoder 30 may select a particular VLC table or group of tables from VLC tables 88 based on information included in the encoded bitstream. This information may for example include syntax information associated with a sequence, group of pictures, frame, slice, LCU, or other series of video blocks to identify whether GPB is enabled or disabled, whether AMP is enabled or disable, and/or whether Inter_N×N mode is enabled or disabled. Prediction unit 81 determines a prediction mode for the CU based on the first VLC codeword (603). Prediction unit 81 can determine the mode for CU by identifying which prediction mode corresponds to the first VLC codeword for the selected VLC table. Prediction unit 81 uses the prediction mode to reconstruct the CU (604). Counter 87 of prediction unit 81 can count a number of occurrences of each prediction mode in a set of prediction modes for a frame and adjust the mapping of the set of prediction modes to codewords based on the number of occurrences of each prediction mode (605). This counting and mapping can be reset for each new frame, each new slice, or each new sequence.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

The invention claimed is:
1. A method of coding a coded unit (CU) of video, the method comprising:
maintaining, by a video coding device, one or more variable length coding (VLC) tables that map VLC codewords to a plurality of prediction modes;
counting a number of occurrences of each of the prediction modes in a set of the prediction modes for a current frame;
adjusting a mapping of the set of prediction modes to codewords based on the number of occurrences of each prediction mode;
resetting the mapping of the set of prediction modes to codewords in response to receiving a new frame of video following the current frame;
receiving a first VLC codeword associated with a CU of the current frame;

determining one of the prediction modes for the CU based on the first VLC codeword; and reconstructing the CU using the prediction mode.

2. The method of claim 1, wherein the plurality of prediction modes comprises one or more of:
skip;
direct;
merge;
Inter__2N×2N;
Inter_N×2N;
Inter__2N×N;
InterN×N;
Inter2N×nU;
Inter__2N×nD;
Inter_nL×2N;
Inter_nR×2N;
Inter__2N×2N; or
Inter_N×N.

3. The method of claim 1, further comprising:
receiving a second VLC codeword associated with the CU;
wherein the first VLC codeword identifies a second VLC table, and the second VLC codeword identifies the prediction mode in the second VLC table.

4. The method of claim 1, wherein maintaining one or more VLC tables that map VLC codewords to the plurality of prediction modes comprises maintaining a first group of VLC tables associated with a first CU depth and a second group of VLC tables associated with a second CU depth.

5. The method of claim 1, wherein maintaining one or more VLC tables that map VLC codewords to the plurality of prediction modes comprises maintaining a first group of VLC tables associated with CUs of frames that were coded as generalized P/B (GPB) frames and a second group of VLC tables associated with CUs of frames that were not coded as GPB frames.

6. The method of claim 1, wherein maintaining one or more VLC tables that map VLC codewords to the plurality of prediction modes comprises maintaining a first group of VLC tables associated with CUs that have asymmetric motion partitioning (AMP) enabled and a second group of VLC tables associated with CUs that have asymmetric AMP disabled.

7. The method of claim 6, wherein the first group of VLC tables comprises a first sub-group of tables for CUs that are smallest coded units and a second sub-group of tables for CUs that are not smallest coded units.

8. The method of claim 1, wherein the prediction mode is a first prediction mode of the CU, and further comprising:
assigning at least one other symbol to the VLC codeword, wherein the at least one other symbol indicates a second prediction mode.

9. The method of claim 1, wherein the method is performed by a video encoding device.

10. The method of claim 1, wherein the method is performed by a video decoding device.

11. The method of claim 1, wherein
maintaining comprises maintaining, by a video coder for coding a CU of video, the video coder included in a device for processing video data;
receiving comprises receiving by the video coder;
determining comprises determining by the video coder; and
reconstructing comprises reconstructing by the video coder.

12. The apparatus method of claim 1, wherein
maintaining comprises maintaining, by means for maintaining one or more variable length coding (VLC) tables that map VLC codewords to a plurality of prediction modes;
receiving comprises receiving by means for receiving a first VLC codeword associated with a CU;
determining comprises determining by means for determining one of the prediction modes for the CU based on the first VLC codeword; and
reconstructing comprises reconstructing by means for reconstructing the CU using the prediction.

13. The method of claim 1, wherein
maintaining comprises executing, by one or more processors of a device for coding video data, instructions stored on a non-transitory computer-readable storage medium that cause the one or more processors to maintain;
receiving comprises executing, by the one or more processors, instructions stored on the non-transitory computer-readable storage medium that cause the one or more processors to receive;
determining comprises executing, by the one or more processors, instructions stored on the non-transitory computer-readable storage medium that cause the one or more processors to determine; and
reconstructing comprises executing, by the one or more processors, instructions stored on the non-transitory computer-readable storage medium that cause the one or more processors to reconstruct.

14. A device for processing video data, the device comprising:
a video coder for coding a coded unit (CU) of video, the video coder configured to:
maintain one or more variable length coding (VLC) tables that map VLC codewords to a plurality of prediction modes;
count a number of occurrences of each of the prediction modes in a set of the prediction modes for a current frame;
adjust a mapping of the set of prediction modes to codewords based on the number of occurrences of each prediction mode;
reset the mapping of the set of prediction modes to codewords in response to receiving a new frame of video following the current frame;
receive a first VLC codeword associated with a CU of the current frame;
determine a prediction mode for the CU based on the first VLC codeword; and
reconstruct the CU using the prediction mode.

15. The device of claim 14, wherein the plurality of prediction modes comprises one or more of:
skip;
direct;
merge;
Inter__2N×2N;
Inter_N×2N;
Inter__2N×N;
InterN×N;
Inter2N×nU;
Inter__2N×nD;
Inter_nL×2N;
Inter_nR×2N;
Intra__2N×2N; or
Intra_N×N.

16. The device of claim 14, wherein the video coder is further configured to:

receive a second VLC codeword associated with the CU;
wherein the first VLC codeword identifies a second VLC table, and the second VLC codeword identifies the prediction mode in the second VLC table.

17. The device of claim 14, wherein the video coder is further configured to:
maintain a first group of VLC tables associated with a first CU depth and a second group of VLC tables associated with a second CU depth.

18. The device of claim 14, wherein the video coder is further configured to:
maintain a first group of VLC tables associated with CUs of frames that were coded as generalized P/B (GPB) frames and a second group of VLC tables associated with CUs of frames that were not coded as GPB frames.

19. The device of claim 14, wherein the video coder is further configured to:
maintain a first group of VLC tables associated with CUs that have asymmetric motion partitioning (AMP) enabled; and
maintain a second group of VLC tables associated with CUs that have asymmetric AMP disabled.

20. The device of claim 19, wherein the first group of VLC tables comprises a first sub-group of tables for CUs that are smallest coded units and a second sub-group of tables for CUs that are not smallest coded units.

21. The device of claim 14, wherein the prediction mode is a first prediction mode of the CU, and wherein the video coder is further configured to:
assign at least one other symbol to the VLC codeword, wherein the at least one other symbol indicates a second prediction mode.

22. The device of claim 14, wherein the video coder is a video encoder.

23. The video coding device of claim 14, wherein the video coder is a video decoder.

24. An apparatus for coding video data, the apparatus comprising:
means for maintaining one or more variable length coding (VLC) tables that map VLC codewords to a plurality of prediction modes;
means for counting a number of occurrences of each of the prediction modes in a set of the prediction modes for a current frame;
means for adjusting a mapping of the set of prediction modes to codewords based on the number of occurrences of each prediction mode;
means for resetting the mapping of the set of prediction modes to codewords in response to receiving a new frame of video following the current frame;
means for receiving a first VLC codeword associated with a CU of the current frame;
means for determining one of the prediction modes for the CU based on the first VLC codeword; and
means for reconstructing the CU using the prediction mode.

25. The apparatus of claim 24, wherein the plurality of prediction modes comprises one or more of:
skip;
direct;
merge;
Inter_2N×2N;
Inter_N×2N;
Inter_2N×N;
InterN×N;
Inter2N×nU;
Inter_2N×nD;
Inter_nL×2N;
Inter_nR×2N;
Intra_2N×2N; or
Intra_N×N.

26. The apparatus of claim 24, further comprising:
means for receiving a second VLC codeword associated with the CU;
wherein the first VLC codeword identifies a second VLC table, and the second VLC codeword identifies the prediction mode in the second VLC table.

27. The apparatus of claim 24, wherein the means for maintaining one or more VLC tables that map VLC codewords to the plurality of prediction modes comprises means for maintaining a first group of VLC tables associated with a first CU depth and a second group of VLC tables associated with a second CU depth.

28. The apparatus of claim 24, wherein the means for maintaining one or more VLC tables that map VLC codewords to the plurality of prediction modes comprises means for maintaining a first group of VLC tables associated with CUs of frames that were coded as generalized P/B (GPB) frames and a second group of VLC tables associated with CUs of frames that were not coded as GPB frames.

29. The apparatus of claim 24, wherein the means for maintaining one or more VLC tables that map VLC codewords to the plurality of prediction modes comprises means for maintaining a first group of VLC tables associated with CUs that have asymmetric motion partitioning (AMP) enabled and means for maintaining a second group of VLC tables associated with CUs that have asymmetric AMP disabled.

30. The apparatus of claim 29, wherein the first group of VLC tables comprises a first sub-group of tables for CUs that are smallest coded units and a second sub-group of tables for CUs that are not smallest coded units.

31. The apparatus of claim 24, wherein the prediction mode is a first prediction mode of the CU, and the apparatus further comprises:
means for assigning at least one other symbol to the VLC codeword, wherein the at least one other symbol indicates a second prediction mode.

32. The apparatus of claim 24, wherein the apparatus is a video encoding device.

33. The apparatus of claim 24, wherein the apparatus is a video decoding device.

34. A non-transitory computer-readable storage medium having stored thereon instructions that, when executed, cause one or more processors of a device for coding video data to:
maintain one or more variable length coding (VLC) tables that map VLC codewords to a plurality of prediction modes;
count a number of occurrences of each of the prediction modes in a set of the prediction modes for a current frame;
adjust a mapping of the set of prediction modes to codewords based on the number of occurrences of each prediction mode;
reset the mapping of the set of prediction modes to codewords in response to receiving a new frame of video following the current frame;
receive a first VLC codeword associated with a CU of the current frame; and
determine one of the prediction modes for the CU based on the first VLC codeword;
reconstruct the CU using the prediction mode.

35. The non-transitory computer-readable storage medium of claim 34, wherein the plurality of prediction modes comprises one or more of:
skip;
direct;
merge;
Inter__2N×2N;
Inter_N×2N;
Inter__2N×N;
InterN×N;
Inter2N×nU;
Inter__2N×nD;
Inter_nL×2N;
Inter_nR×2N;
Intra__2N×2N; or
Intra_N×N.

36. The non-transitory computer-readable storage medium of claim 34, further comprising instructions that cause the one or more processors to:
receive a second VLC codeword associated with the CU;
wherein the first VLC codeword identifies a second VLC table, and the second VLC codeword identifies the prediction mode in the second VLC table.

37. The non-transitory computer-readable storage medium of claim 34, further comprising instructions that cause the one or more processors to maintain a first group of VLC tables associated with a first CU depth and maintain a second group of VLC tables associated with a second CU depth.

38. The non-transitory computer-readable storage medium of claim 34, further comprising instructions that cause the one or more processors to maintain a first group of VLC tables associated with CUs of frames that were coded as generalized P/B (GPB) frames and a second group of VLC tables associated with CUs of frames that were not coded as GPB frames.

39. The non-transitory computer-readable storage medium of claim 34, further comprising instructions that cause the one or more processors to maintain a first group of VLC tables associated with CUs that have asymmetric motion partitioning (AMP) enabled and maintain a second group of VLC tables associated with CUs that have asymmetric AMP disabled.

40. The non-transitory computer-readable storage medium of claim 39, wherein the first group of VLC tables comprises a first sub-group of tables for CUs that are smallest coded units and a second sub-group of tables for CUs that are not smallest coded units.

41. The non-transitory computer-readable storage medium of claim 34, wherein the prediction mode is a first prediction mode of the CU, and wherein the computer program product further comprises instructions to cause the processor to:
assign at least one other symbol to the VLC codeword, wherein the at least one other symbol indicates a second prediction mode.

42. The non-transitory computer-readable storage medium of claim 34, wherein the one or more processors are components of a video encoding device.

43. The non-transitory computer-readable storage medium of claim 34, wherein the one or more processors are components of a video decoding device.

44. A method of coding a coded unit (CU) of video, the method comprising:
maintaining, by a video coding device, one or more variable length coding (VLC) tables that map VLC codewords to a plurality of prediction modes;
counting a number of occurrences of each of the prediction modes in a set of the prediction modes for a current frame;
adjusting a mapping of the set of prediction modes to codewords based on the number of occurrences of each prediction mode;
resetting the mapping of the set of prediction modes to codewords in response to receiving a new frame of video following the current frame;
determining one of the prediction modes for a CU of the current frame;
determining a VLC codeword from the one or more VLC tables based on the determined prediction mode; and
generating a syntax element containing the VLC codeword.

45. The method of claim 44, wherein the plurality of prediction modes comprises one or more of:
skip;
direct;
merge;
Inter__2N×2N;
Inter_N×2N;
Inter__2N×N;
InterN×N;
Inter2N×nU;
Inter__2N×nD;
Inter_nL×2N;
Inter_nR×2N;
Intra__2N×2N; or
Intra_N×N.

46. The method of claim 44, wherein maintaining one or more VLC tables that map VLC codewords to the plurality of prediction modes comprises maintaining a first group of VLC tables associated with a first CU depth and a second group of VLC tables associated with a second CU depth.

47. The method of claim 44, wherein maintaining one or more VLC tables that map VLC codewords to the plurality of prediction modes comprises maintaining a first group of VLC tables associated with CUs of frames that were coded as generalized P/B (GPB) frames and a second group of VLC tables associated with CUs of frames that were not coded as GPB frames.

48. The method of claim 44, wherein maintaining one or more VLC tables that map VLC codewords to the plurality of prediction modes comprises maintaining a first group of VLC tables associated with CUs that have asymmetric motion partitioning (AMP) enabled and a second group of VLC tables associated with CUs that have asymmetric AMP disabled.

49. The method of claim 48, wherein the first group of VLC tables comprises a first sub-group of tables for CUs that are smallest coded units and a second sub-group of tables for CUs that are not smallest coded units.

50. A device for processing video data, the device comprising:
a video coder for coding a coded unit (CU) of video, the video coder configured to:
maintain one or more variable length coding (VLC) tables that map VLC codewords to a plurality of prediction modes;
count a number of occurrences of each of the prediction modes in a set of the prediction modes for a current frame;
adjust a mapping of the set of prediction modes to codewords based on the number of occurrences of each prediction mode;
reset the mapping of the set of prediction modes to codewords in response to receiving a new frame of video following the current frame;
determine one of the prediction modes for a CU of the current frame;

determine a VLC codeword from the one or more VLC tables based on the determined prediction mode; and
generate a syntax element containing the VLC codeword.

51. The device of claim 50, wherein the plurality of prediction modes comprises one or more of:
   skip;
   direct;
   merge;
   Inter_2N×2N;
   Inter_N×2N;
   Inter_2N×N;
   InterN×N;
   Inter2N×nU;
   Inter_2N×nD;
   Inter_nL×2N;
   Inter_nR×2N;
   Intra_2N×2N; or
   Intra_N×N.

52. The device of claim 50, wherein the video coder is further configured to maintain a first group of VLC tables associated with a first CU depth and a second group of VLC tables associated with a second CU depth.

53. The device of claim 50, wherein the video coder is further configured to maintain a first group of VLC tables associated with CUs of frames that were coded as generalized P/B (GPB) frames and maintain a second group of VLC tables associated with CUs of frames that were not coded as GPB frames.

54. The device of claim 50, wherein the video coder is further configured to maintain a first group of VLC tables associated with CUs that have asymmetric motion partitioning (AMP) enabled and maintain a second group of VLC tables associated with CUs that have asymmetric AMP disabled.

55. The device of claim 54, wherein the first group of VLC tables comprises a first sub-group of tables for CUs that are smallest coded units and a second sub-group of tables for CUs that are not smallest coded units.

56. An apparatus for coding video data, the apparatus comprising:
   means for maintaining one or more variable length coding (VLC) tables that map VLC codewords to a plurality of prediction modes;
   means for counting a number of occurrences of each of the prediction modes in a set of the prediction modes for a current frame;
   means for adjusting a mapping of the set of prediction modes to codewords based on the number of occurrences of each prediction mode;
   means for resetting the mapping of the set of prediction modes to codewords in response to receiving a new frame of video following the current frame;
   means for determining one of the prediction modes for a CU of the current frame;
   means for determining a VLC codeword from the one or more VLC tables based on the determined prediction mode; and
   means for generating a syntax element containing the VLC codeword.

57. The apparatus of claim 56, wherein the plurality of prediction modes comprises one or more of:
   skip;
   direct;
   merge;
   Inter_2N×2N;
   Inter_N×2N;
   Inter_2N×N;
   InterN×N;
   Inter2N×nU;
   Inter_2N×nD;
   Inter_nL×2N;
   Inter_nR×2N;
   Intra_2N×2N; or
   Intra_N×N.

58. The apparatus of claim 56, wherein the means for maintaining one or more VLC tables that map VLC codewords to the plurality of prediction modes comprises means for maintaining a first group of VLC tables associated with a first CU depth and means for maintaining a second group of VLC tables associated with a second CU depth.

59. The apparatus of claim 56, wherein the means for maintaining one or more VLC tables that map VLC codewords to the plurality of prediction modes comprises means for maintaining a first group of VLC tables associated with CUs of frames that were coded as generalized P/B (GPB) frames and means for maintaining a second group of VLC tables associated with CUs of frames that were not coded as GPB frames.

60. The apparatus of claim 56, wherein the means for maintaining one or more VLC tables that map VLC codewords to the plurality of prediction modes comprises means for maintaining a first group of VLC tables associated with CUs that have asymmetric motion partitioning (AMP) enabled and means for maintaining a second group of VLC tables associated with CUs that have asymmetric AMP disabled.

61. The apparatus of claim 60, wherein the first group of VLC tables comprises a first sub-group of tables for CUs that are smallest coded units and a second sub-group of tables for CUs that are not smallest coded units.

62. A non-transitory computer-readable storage medium having stored thereon instructions that, when executed, cause one or more processors of a device for coding video data to:
   maintain one or more variable length coding (VLC) tables that map VLC codewords to a plurality of prediction modes;
   count a number of occurrences of each of the prediction modes in a set of the prediction modes for a current frame;
   adjust a mapping of the set of prediction modes to codewords based on the number of occurrences of each prediction mode;
   reset the mapping of the set of prediction modes to codewords in response to receiving a new frame of video following the current frame;
   determine one of the prediction modes for a CU of the current frame;
   determine a VLC codeword from the one or more VLC tables based on the determined prediction mode; and
   generate a syntax element containing the VLC codeword.

63. The non-transitory computer-readable storage medium of claim 62, wherein the plurality of prediction modes comprises one or more of:
   skip;
   direct;
   merge;
   Inter_2N×2N;
   Inter_N×2N;
   Inter_2N×N;
   InterN×N;
   Inter2N×nU;
   Inter_2N×nD;

Inter_nL×2N;
Inter_nR×2N;
Intra_2N×2N; or
Intra_N×N.

64. The non-transitory computer-readable storage medium of claim 62, instructions that cause the one or more processors to maintain a first group of VLC tables associated with a first CU depth and maintain a second group of VLC tables associated with a second CU depth.

65. The non-transitory computer-readable storage medium of claim 62, instructions that cause the one or more processors to maintain a first group of VLC tables associated with CUs of frames that were coded as generalized P/B (GPB) frames and maintain a second group of VLC tables associated with CUs of frames that were not coded as GPB frames.

66. The non-transitory computer-readable storage medium of claim 62, instructions that cause the one or more processors to maintain a first group of VLC tables associated with CUs that have asymmetric motion partitioning (AMP) enabled and maintain a second group of VLC tables associated with CUs that have asymmetric AMP disabled.

67. The non-transitory computer-readable storage medium of claim 66, wherein the first group of VLC tables comprises a first sub-group of tables for CUs that are smallest coded units and a second sub-group of tables for CUs that are not smallest coded units.

\* \* \* \* \*